Nov. 6, 1956 F. P. D'HUY 2,769,187
APPARATUS FOR MANUFACTURING BOOK CASES OR COVERS
Filed April 26, 1951 22 Sheets-Sheet 1
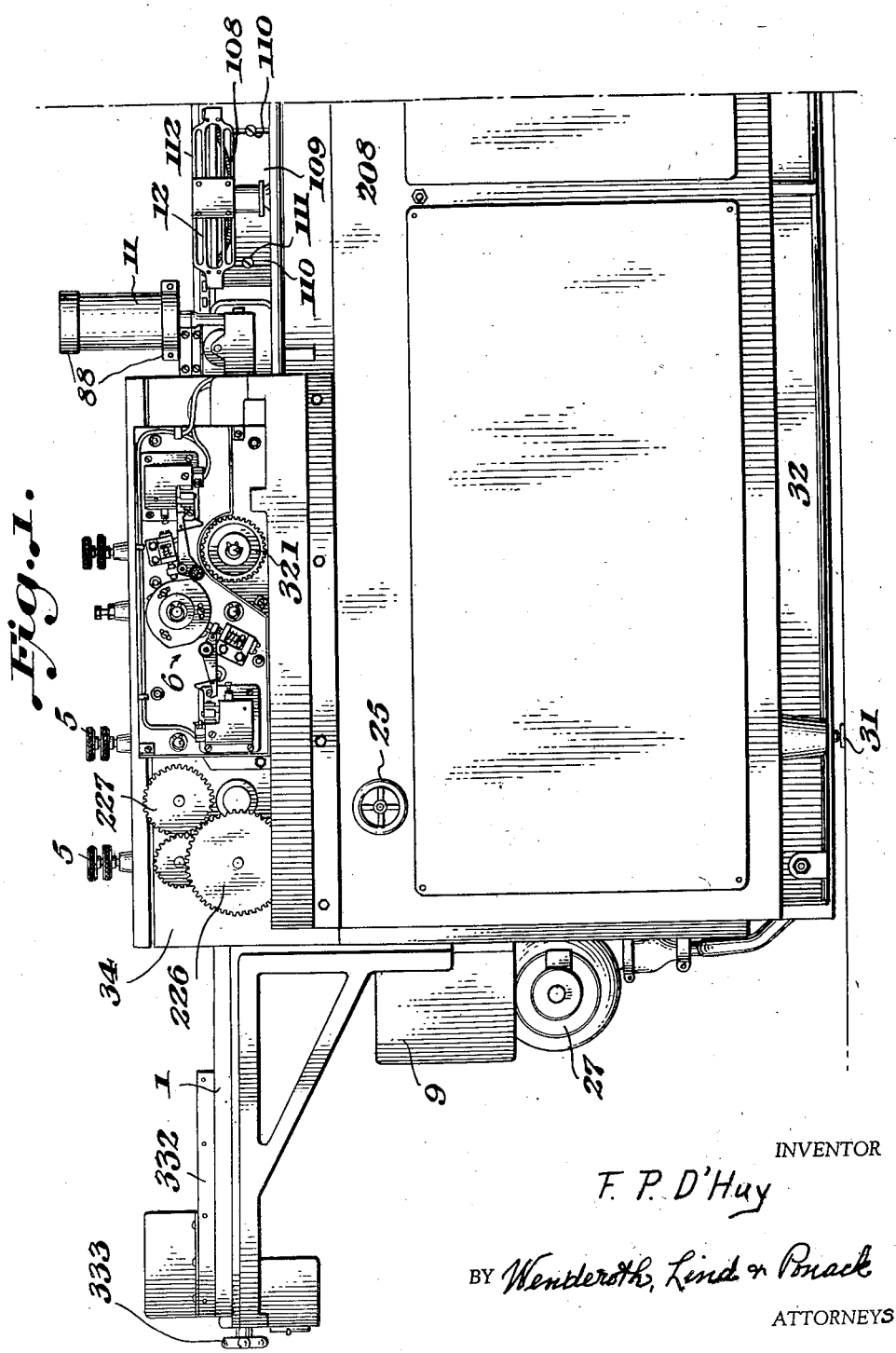
INVENTOR
F. P. D'Huy
BY Wenderoth, Lind & Ponack
ATTORNEYS

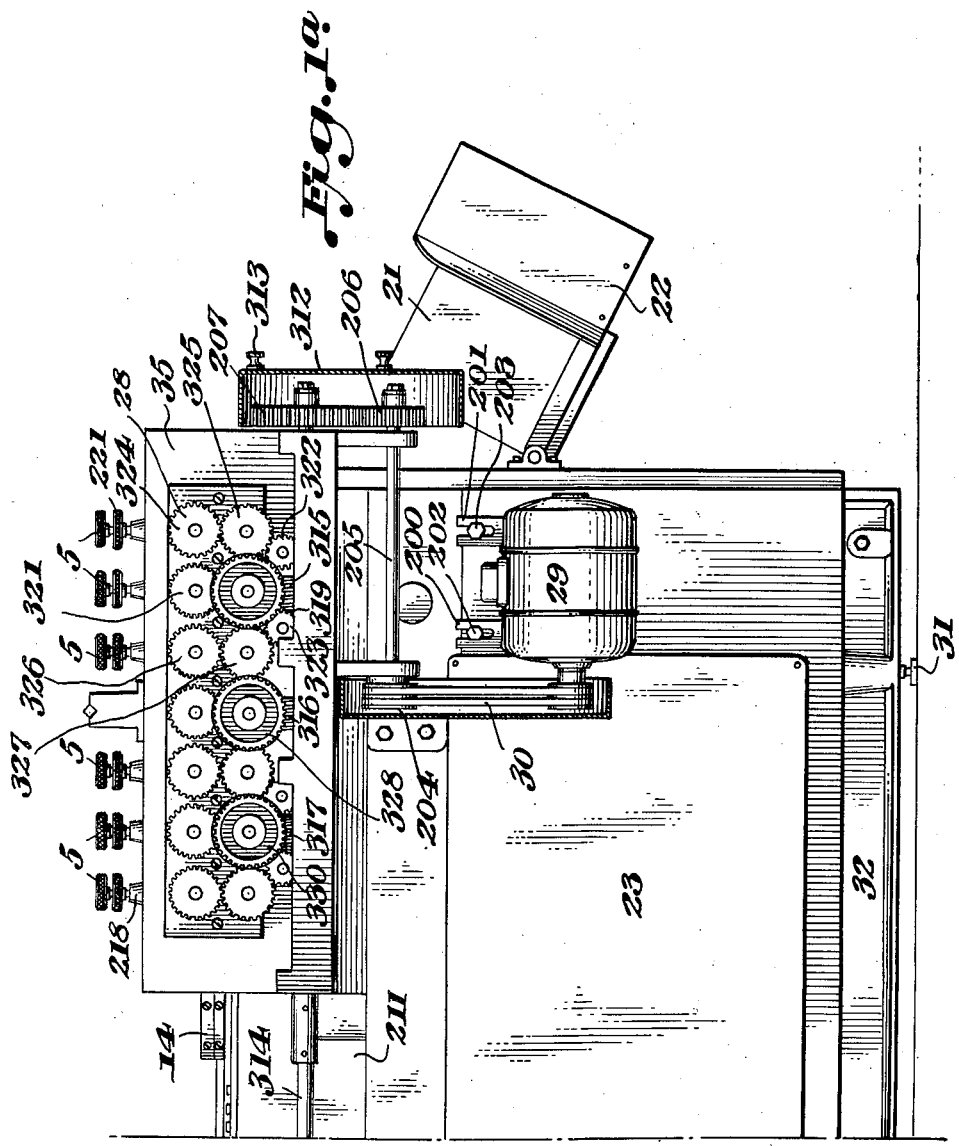

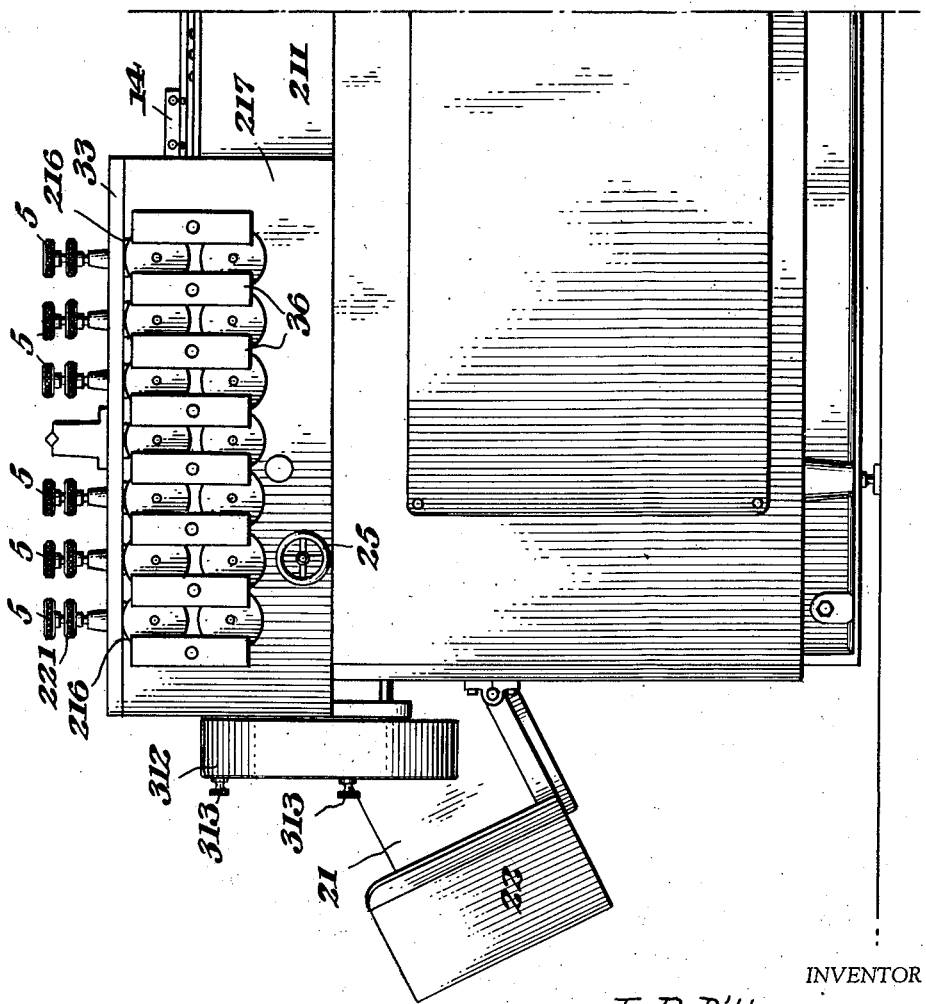

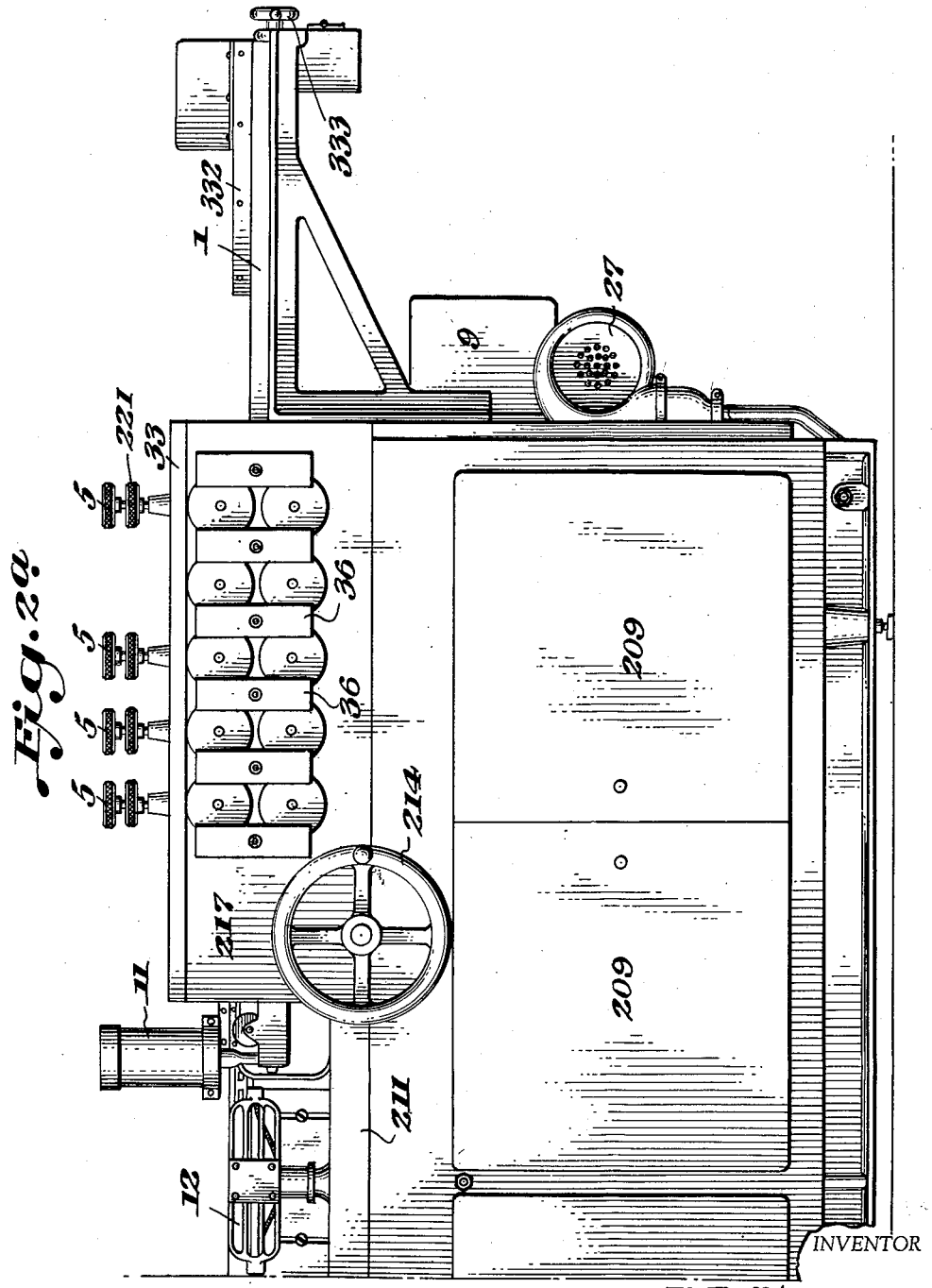

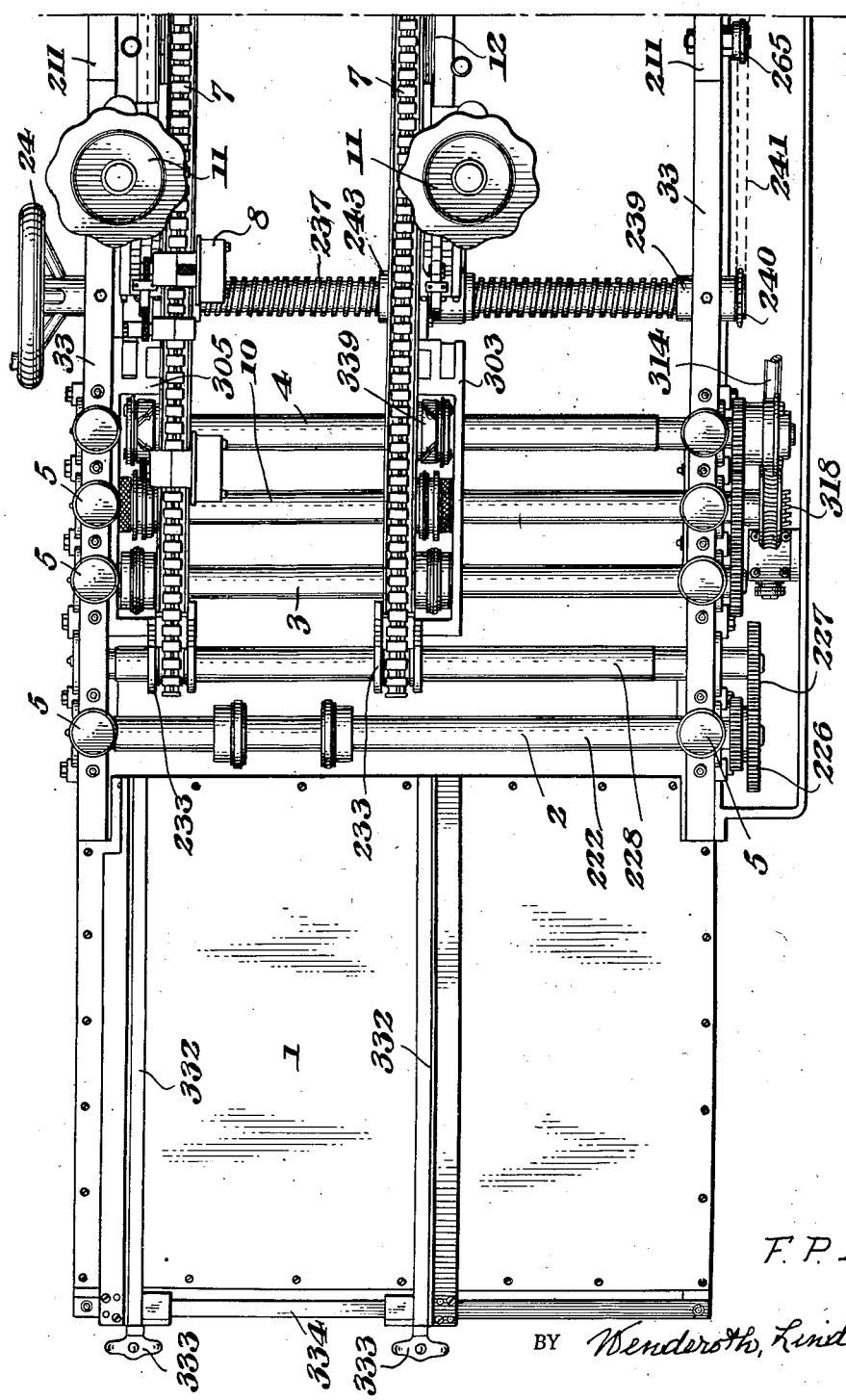

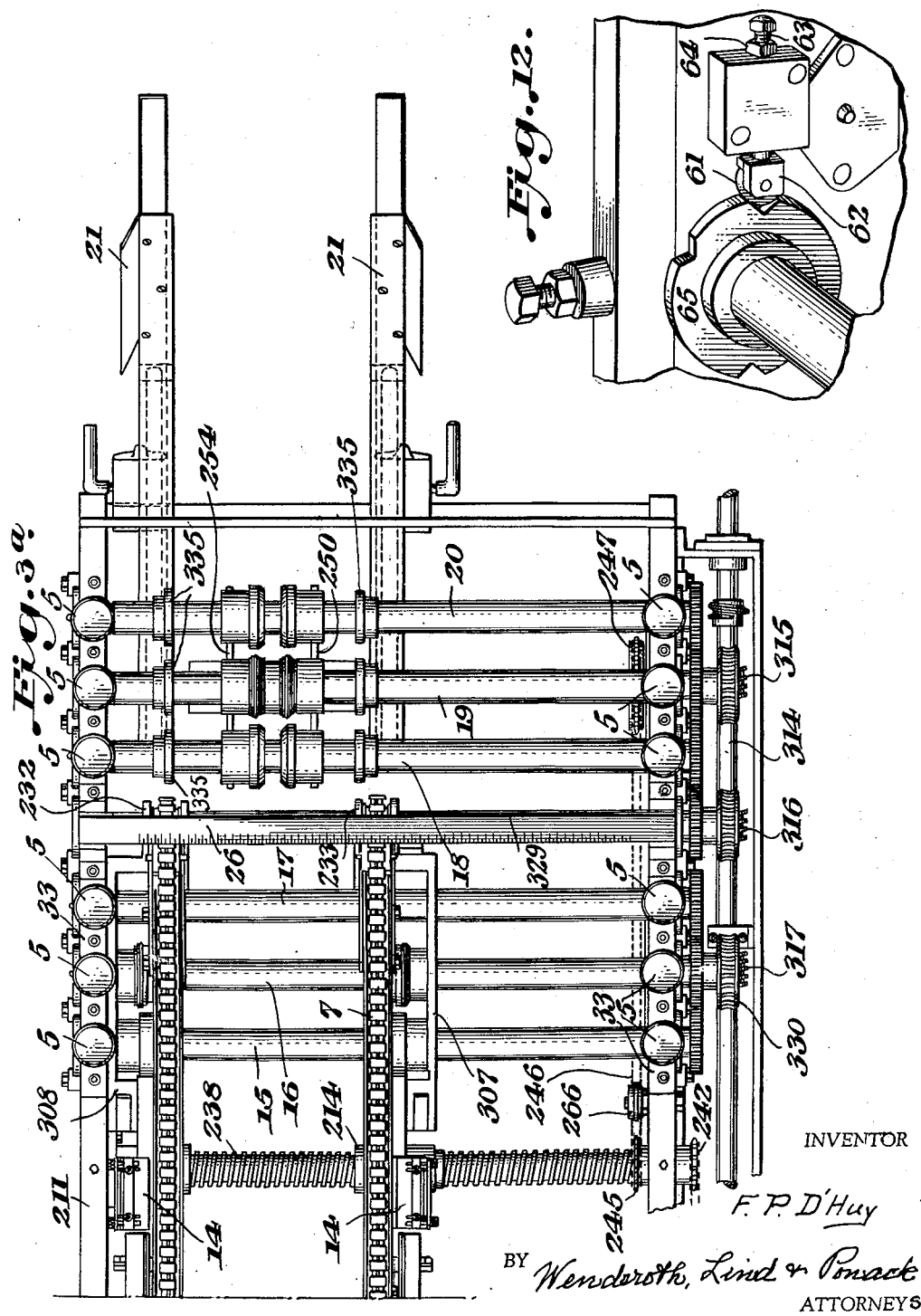

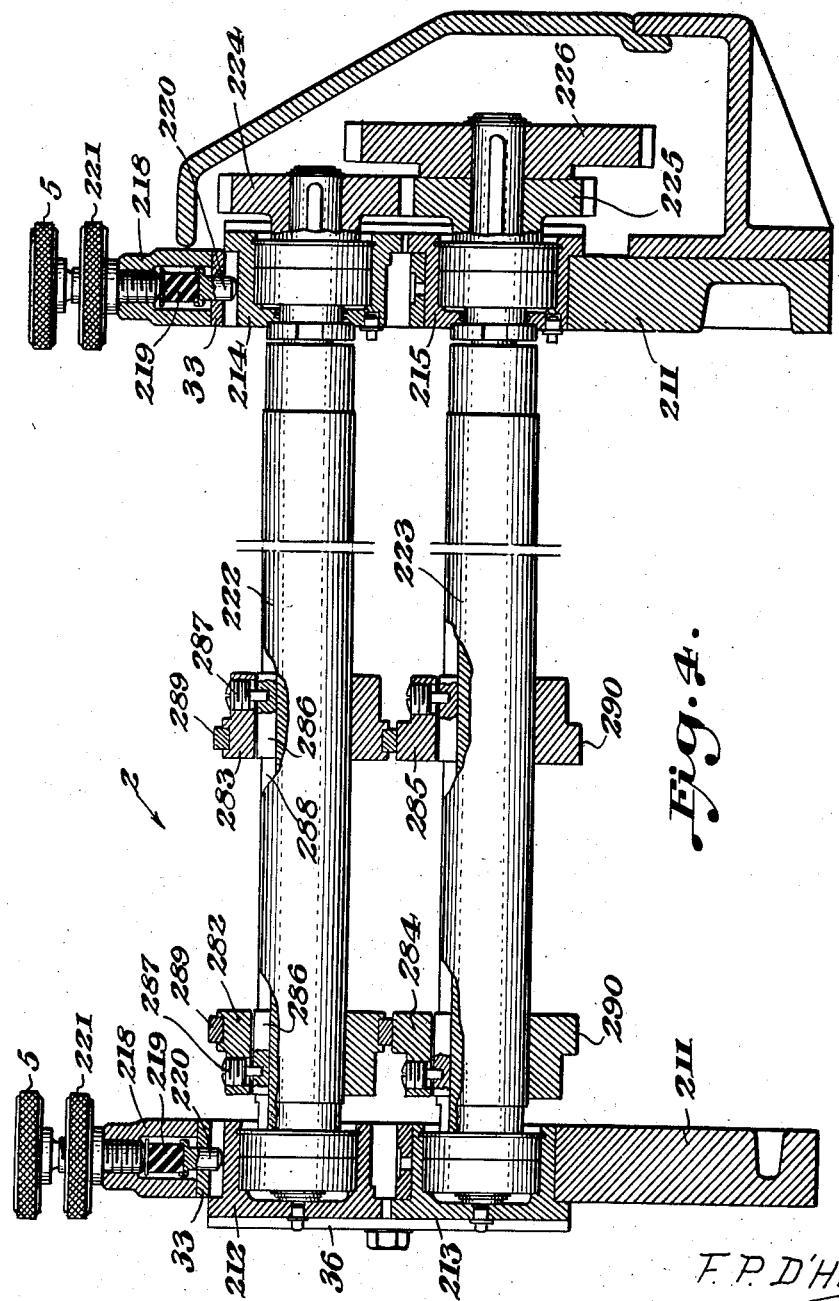

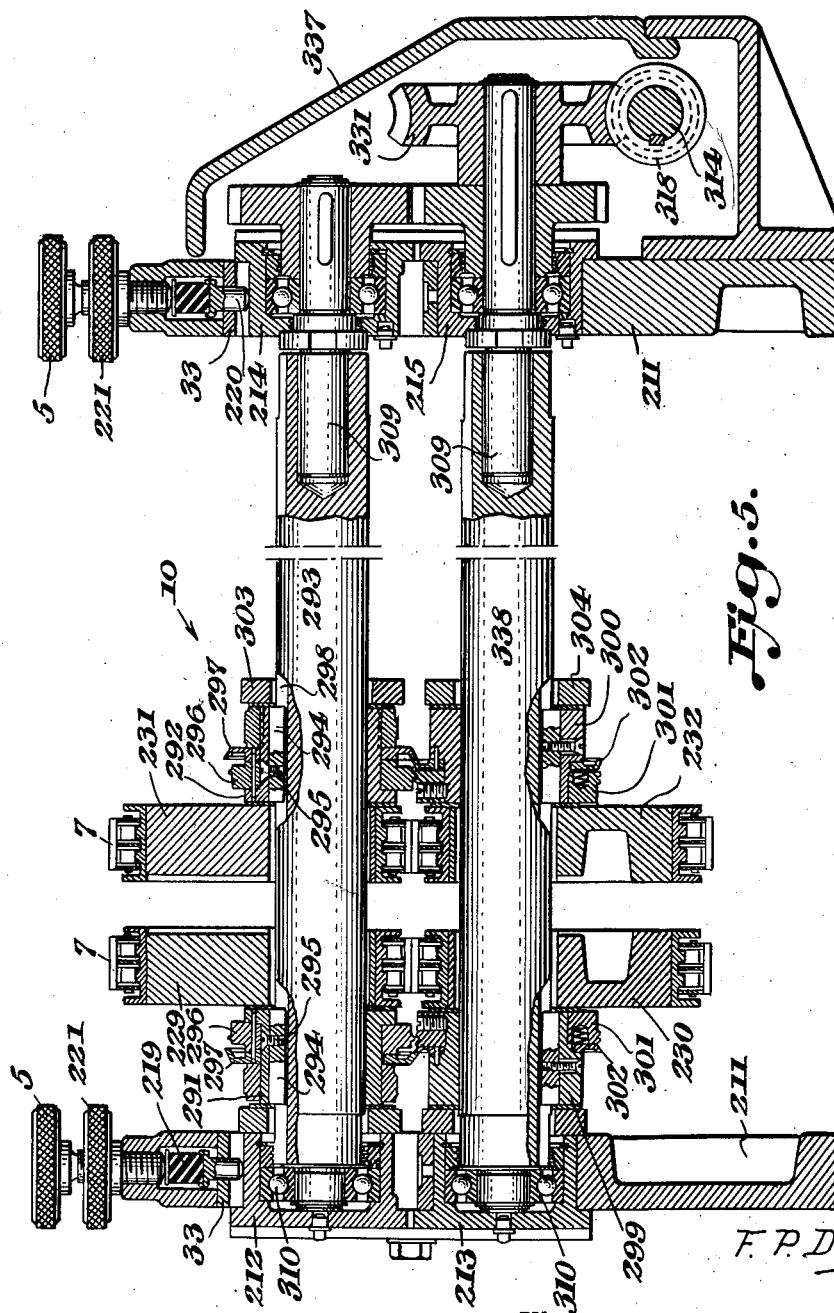

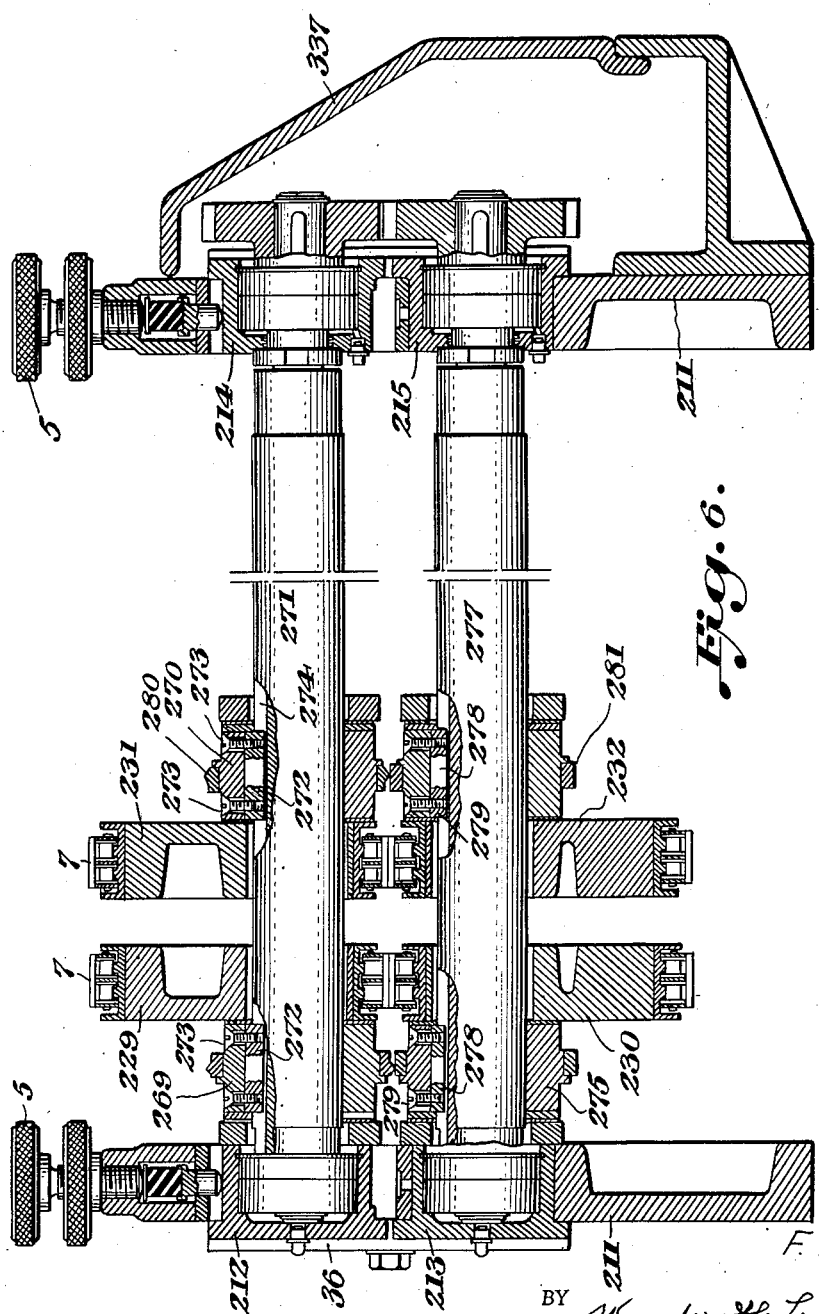

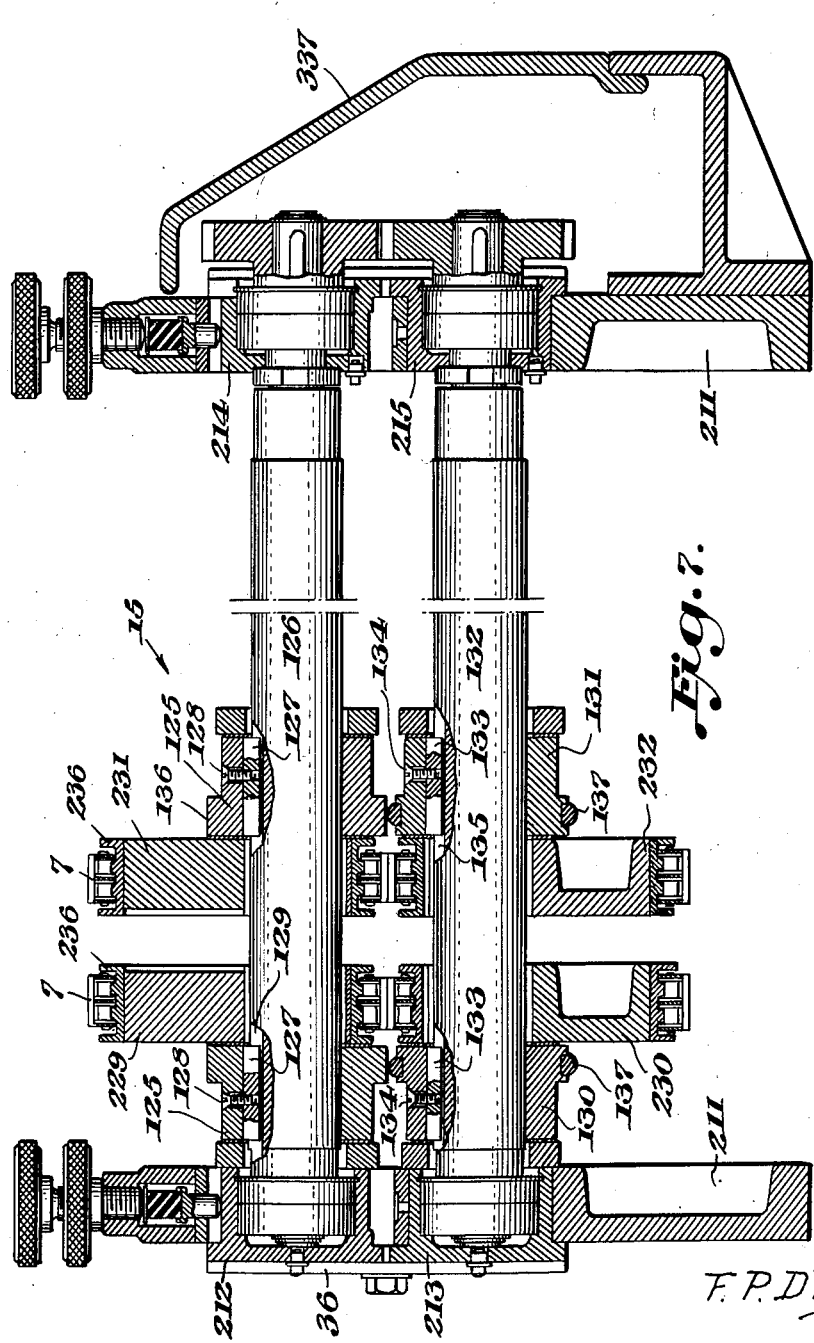

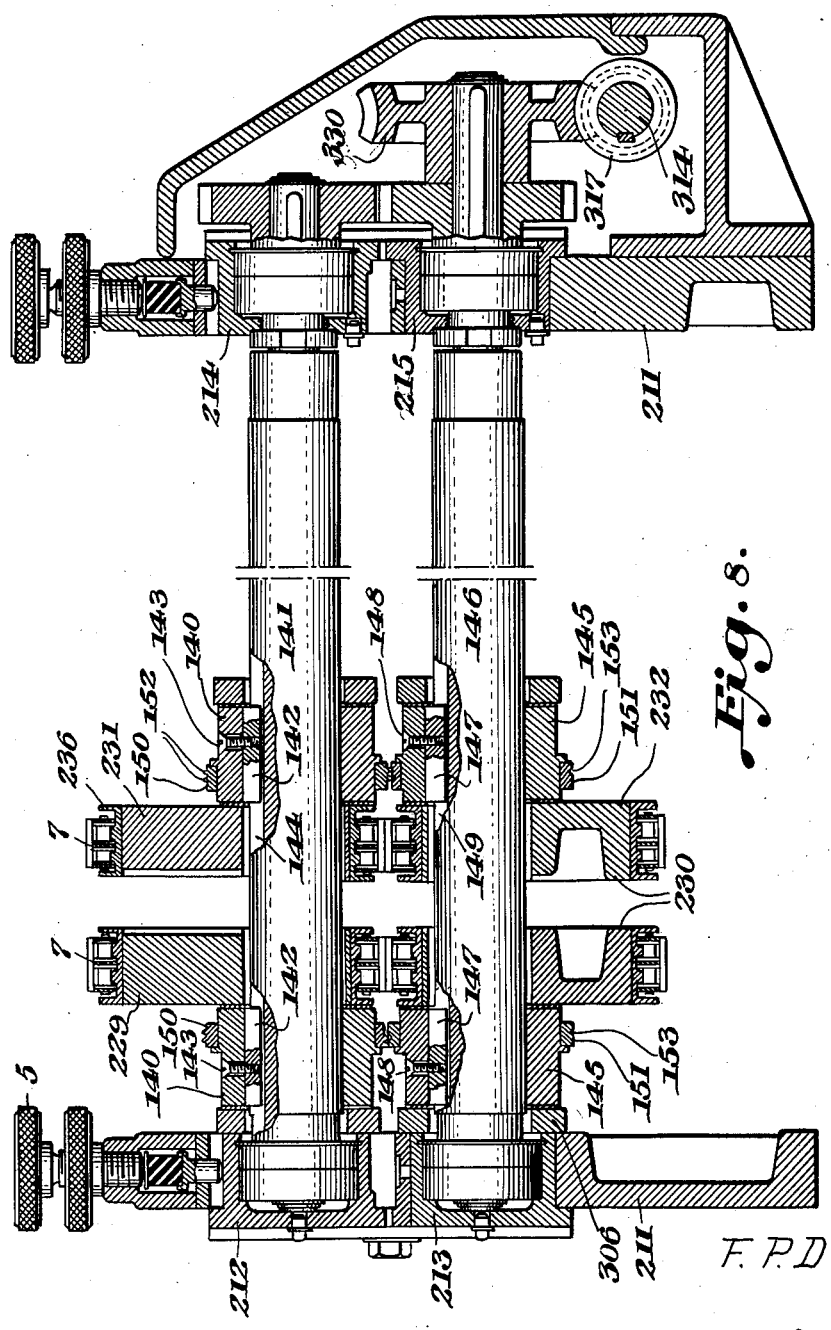

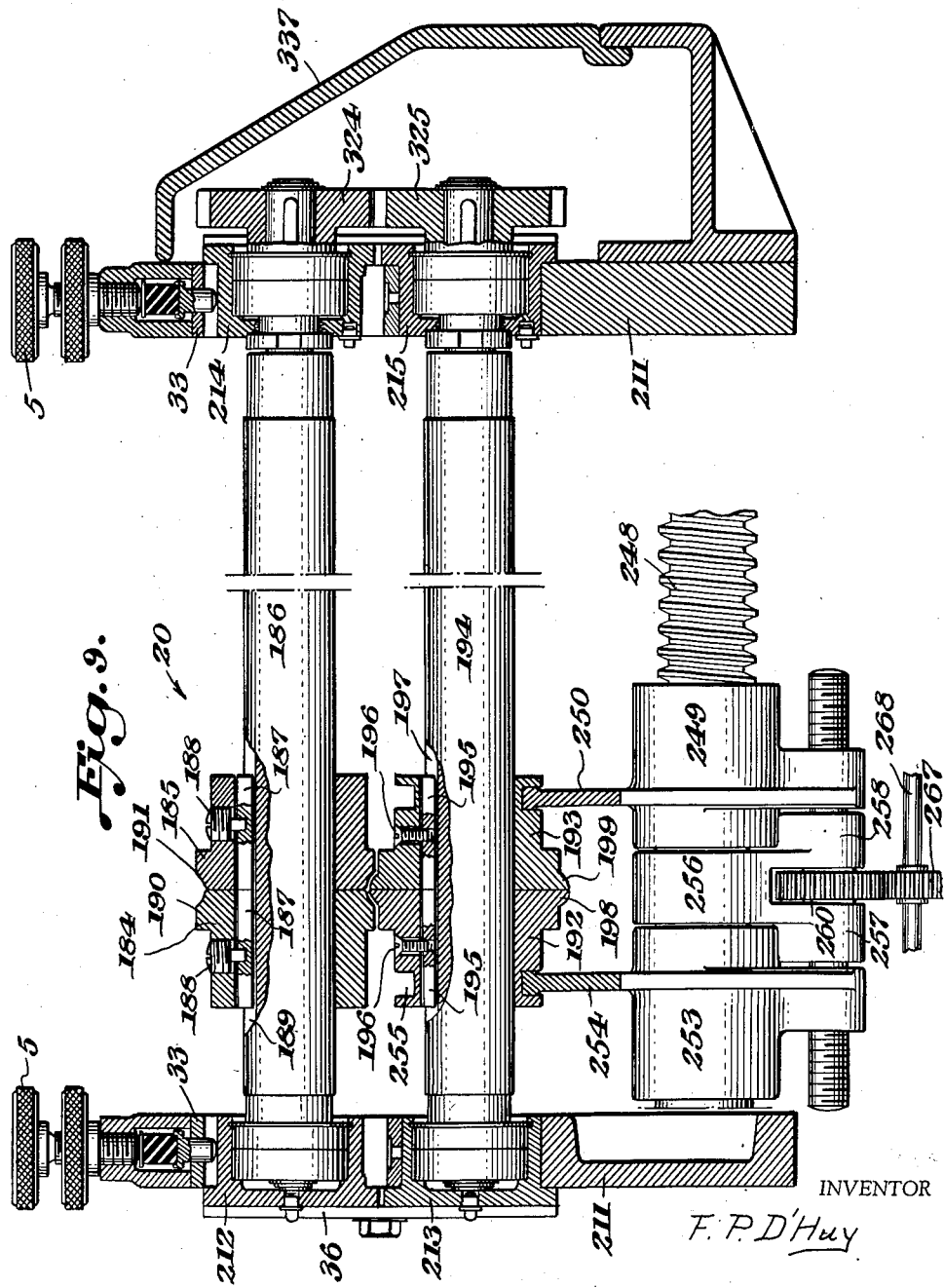

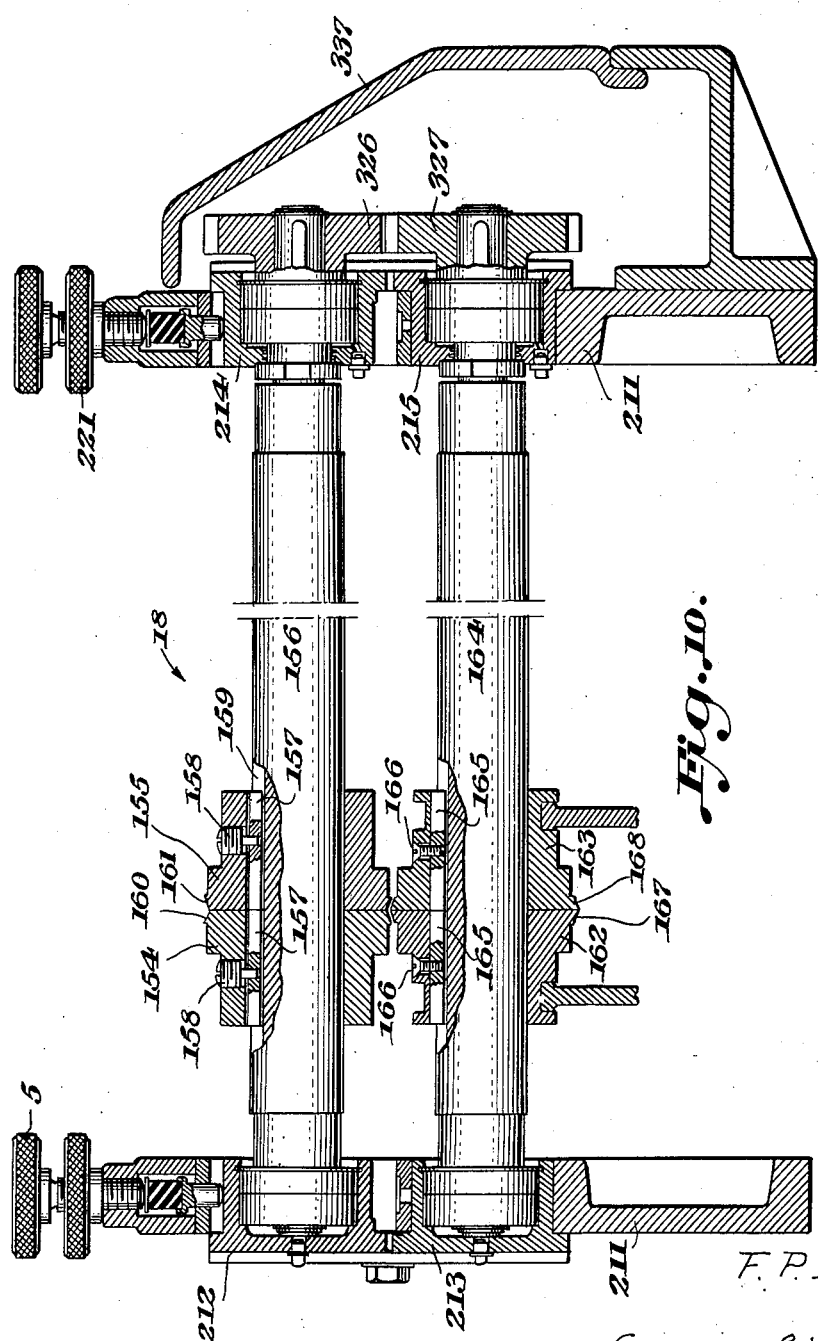

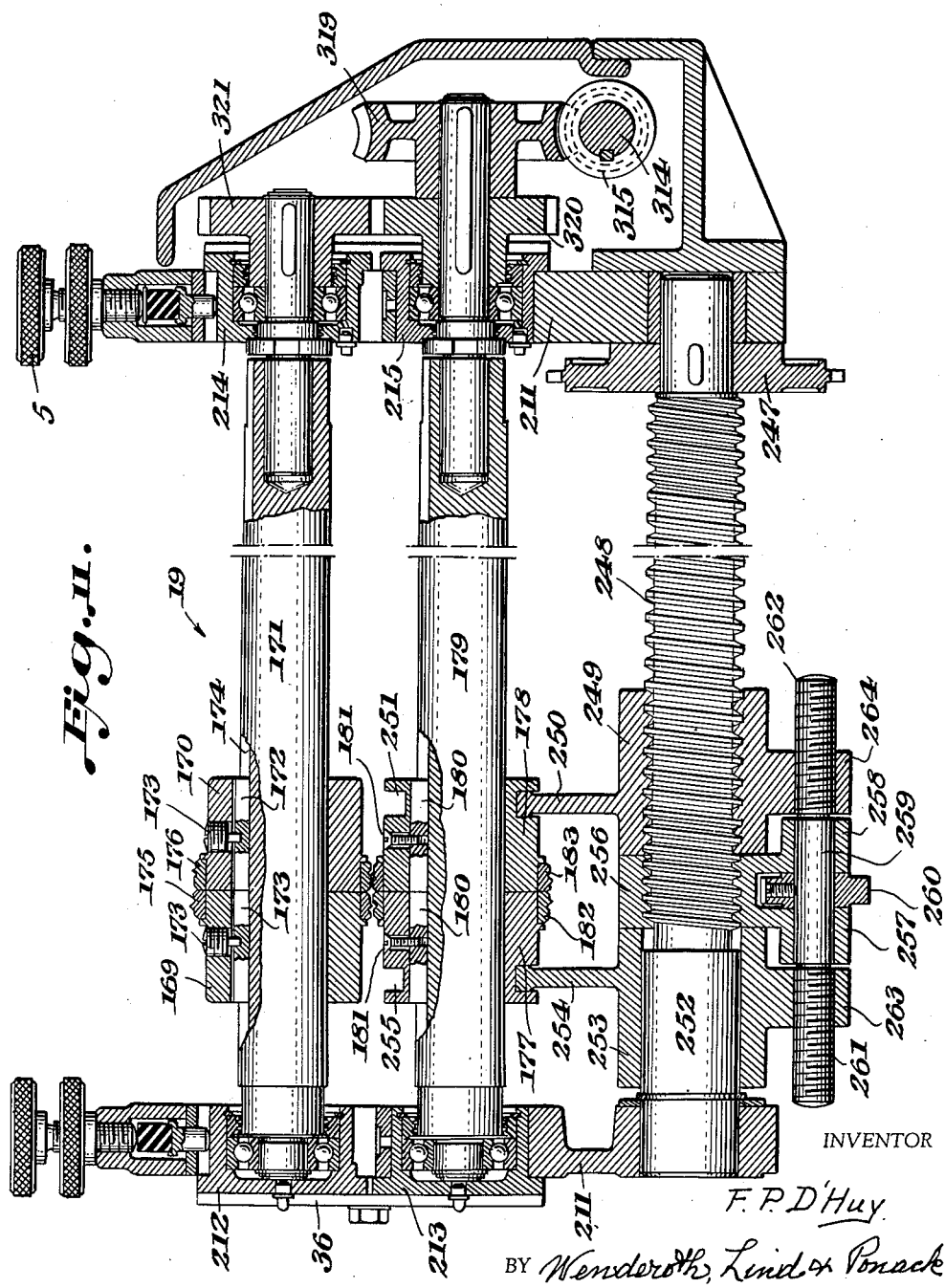

Nov. 6, 1956 F. P. D'HUY 2,769,187
APPARATUS FOR MANUFACTURING BOOK CASES OR COVERS
Filed April 26, 1951 22 Sheets-Sheet 15
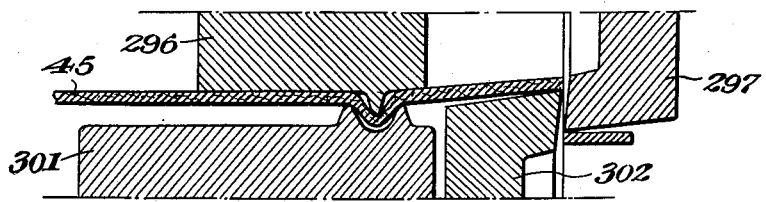
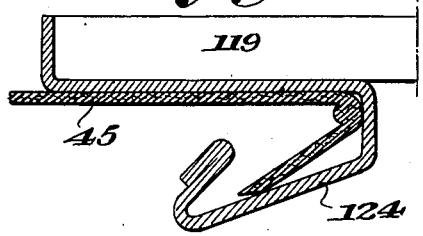
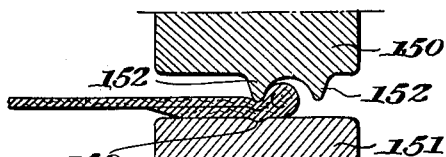
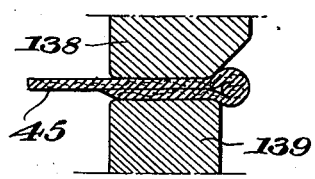
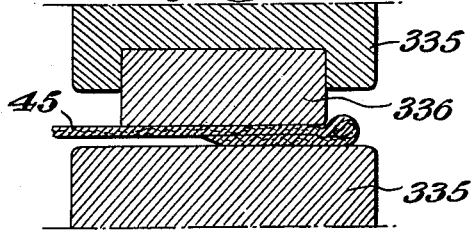
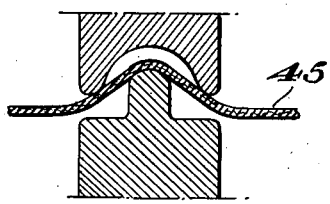
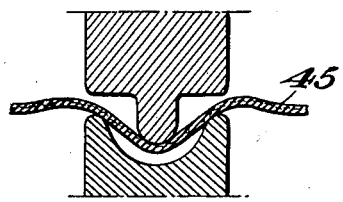
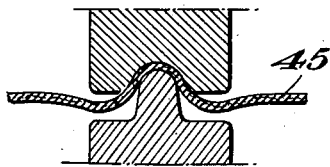
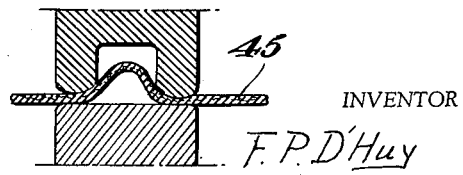
INVENTOR
F. P. D'Huy
BY Wenderoth, Lind & Ponack
ATTORNEYS Nov. 6, 1956 F. P. D'HUY 2,769,187
APPARATUS FOR MANUFACTURING BOOK CASES OR COVERS
Filed April 26, 1951 22 Sheets-Sheet 16
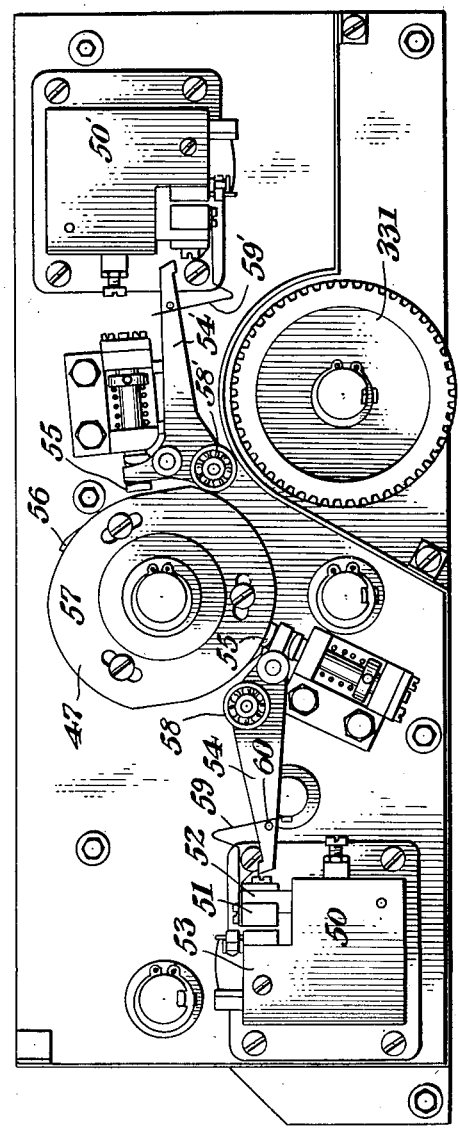
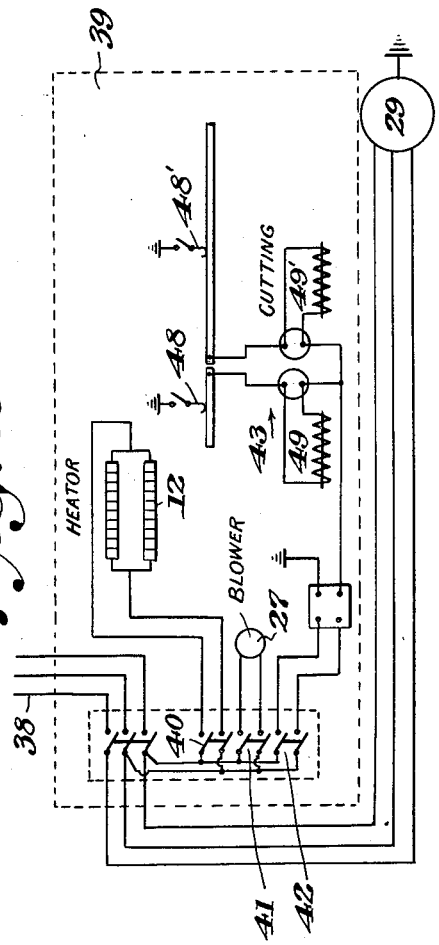
INVENTOR
F. P. D'Huy
BY Wenderoth, Lind & Ponack
ATTORNEYS Nov. 6, 1956 F. P. D'HUY 2,769,187
APPARATUS FOR MANUFACTURING BOOK CASES OR COVERS
Filed April 26, 1951 22 Sheets-Sheet 17
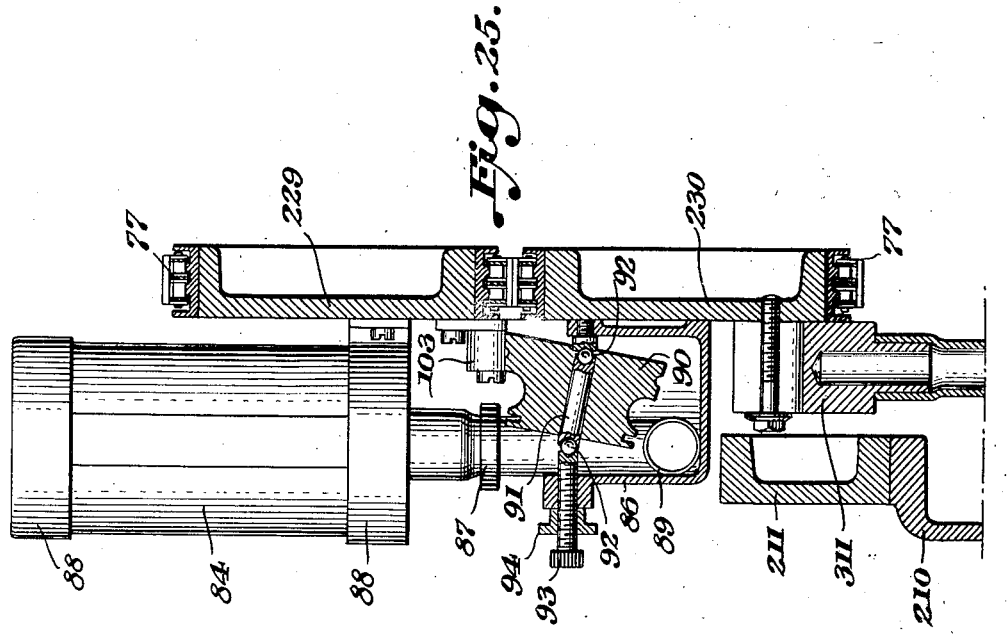
INVENTOR
F. P. D'Huy
BY Wenderoth, Lind & Ponack
ATTORNEYS Nov. 6, 1956 F. P. D'HUY 2,769,187
APPARATUS FOR MANUFACTURING BOOK CASES OR COVERS
Filed April 26, 1951 22 Sheets-Sheet 18
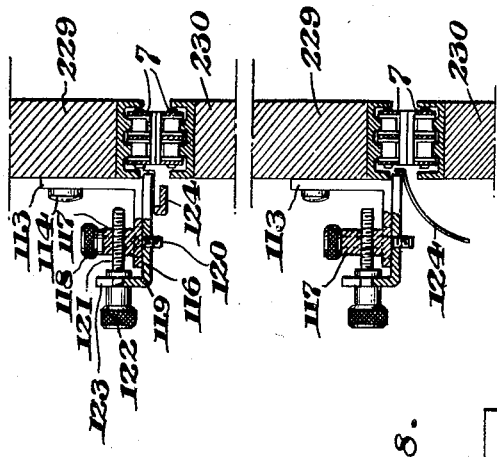
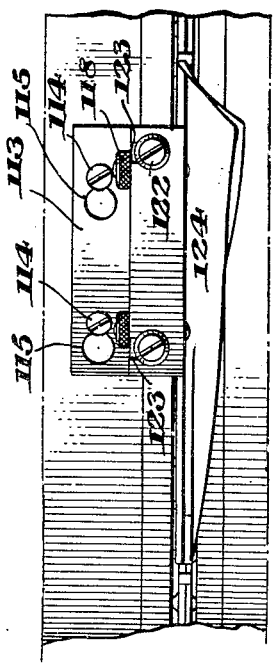
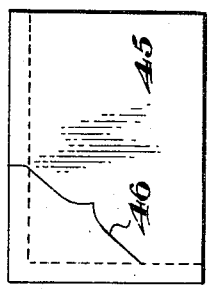
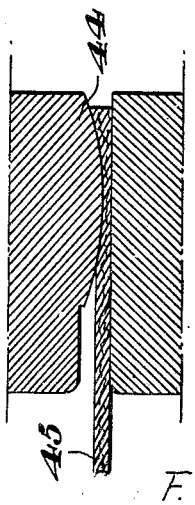
INVENTOR
F. P. D'Huy
BY Wenderoth, Lind & Ponack
ATTORNEYS

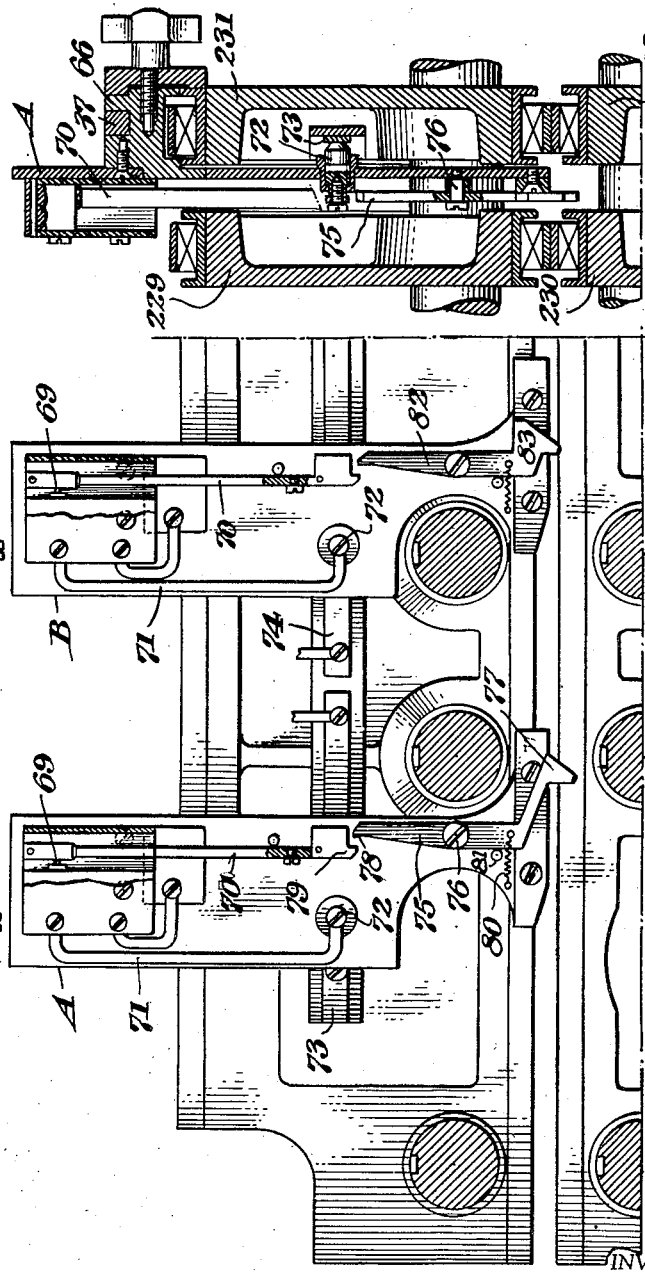
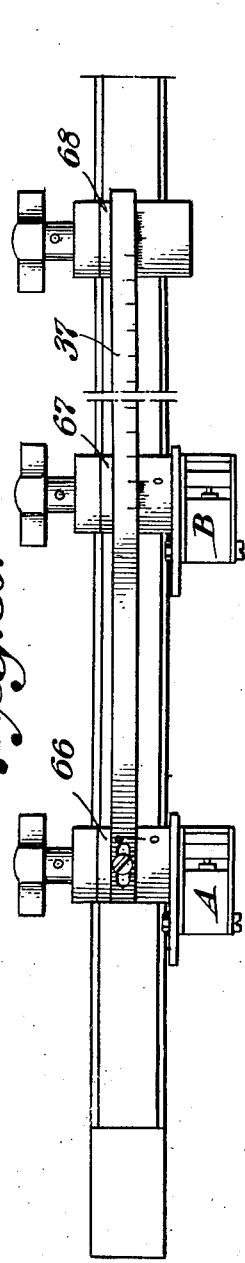

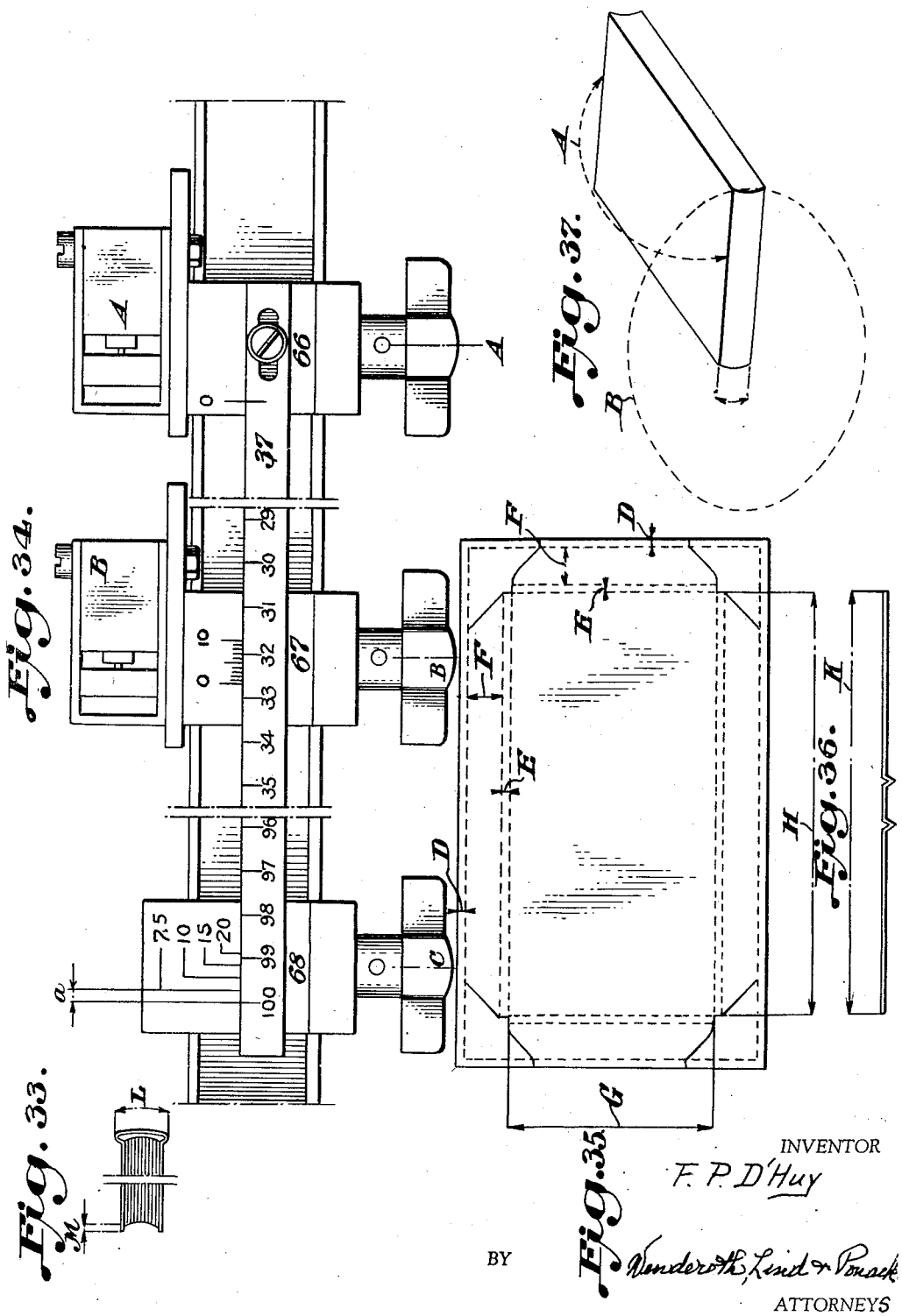

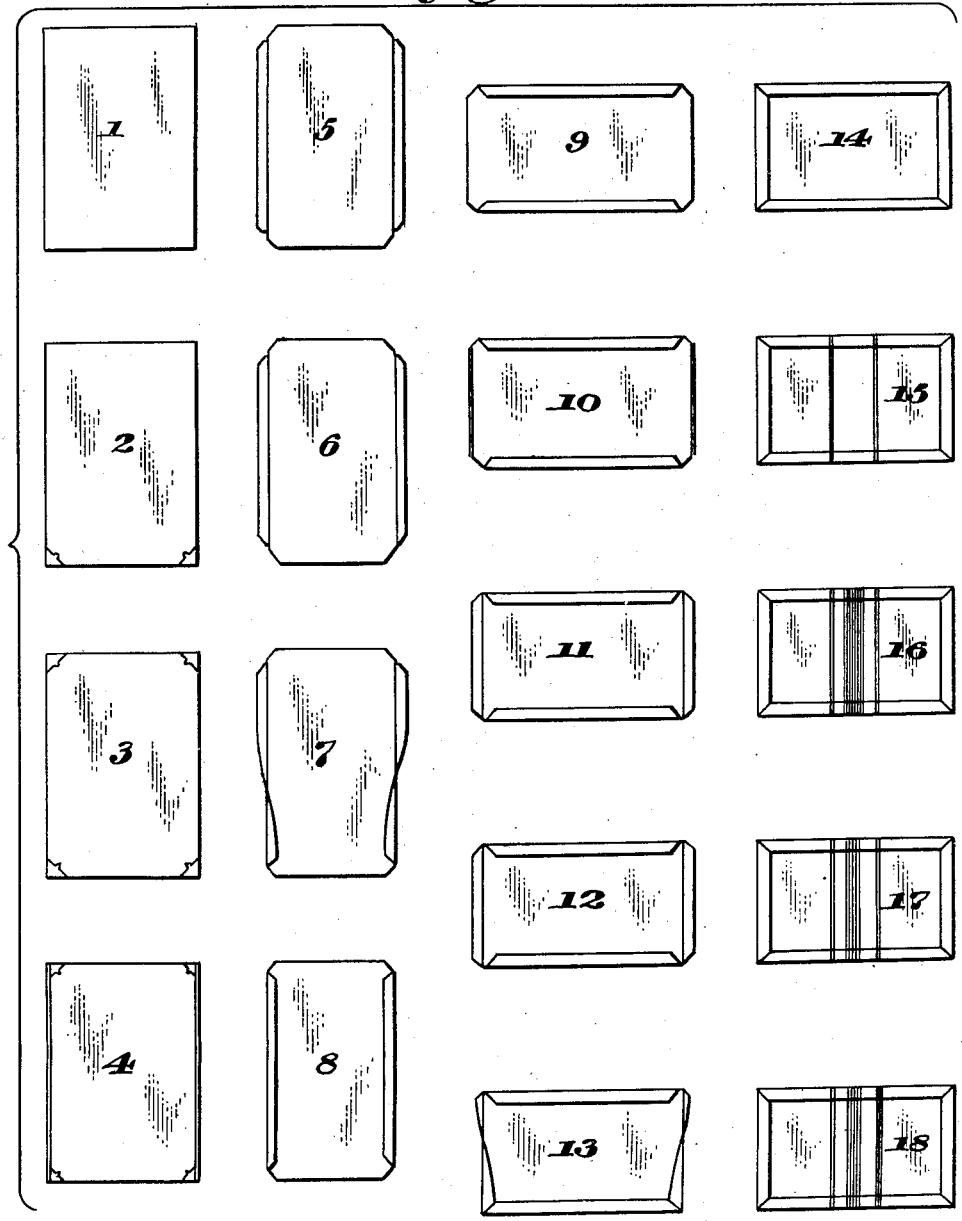

United States Patent Office 2,769,187
Patented Nov. 6, 1956

2,769,187

APPARATUS FOR MANUFACTURING BOOK CASES OR COVERS

Franciscus Pieter D'Huy, Overveen, Netherlands

Application April 26, 1951, Serial No. 222,965

7 Claims. (Cl. 11—2)

This application is a continuation-in-part of application Serial No. 705,096, filed October 23, 1946, entitled Machine for Manufacturing Bookbinding Cases, now abandoned.

An object of the invention is to provide a machine for manufacturing bookbinding cases for book covers from a single sheet of cardboard or the like which extends over the front cover, back portion and back cover of the book to be bound.

A further object of the invention is to provide a machine wherein the edges of the binding case are doubled upon the body of the case with no gaps at the ends of the creases.

A further object of the invention is to provide a machine which will manufacture a bookbinding case at greatly reduced cost which will have the same amount of strength and have as good an appearance as the customary bookbinding case which comprises a separate front cover, back portion, and back cover.

A further object of the invention is to manufacture a bookbinding case from a continuous sheet of material.

A still further object of the invention is to provide a machine which is capable of manufacturing bookbinding cases in the numerous different sizes and in the greatly varying editions from a few hundred to tens of thousands of copies.

With the above and other objects which will become apparent from the detailed description below, a preferred form of the invention is shown upon the drawings wherein:

Figs. 1 and 1a are a front view of one form of the invention;

Figs. 2 and 2a are a rear view of the invention;

Figs. 3 and 3a are a plan view of the invention;

Fig. 4 is a cross-sectional view showing the inlet rollers;

Fig. 5 is a cross-sectional view with parts in elevation showing the cutting and scoring rollers;

Fig. 6 is a cross-sectional view with parts in elevation showing the flattening rollers;

Fig. 7 is a cross-sectional view with parts broken away and in elevation showing the pressing rollers;

Fig. 8 is a cross-sectional view with parts in elevation and broken away showing the scoring section;

Fig. 9 is a cross-sectional view with parts broken away and in elevation showing one set of the back rounding rollers;

Fig. 10 is a similar view of further set of back rounding rollers;

Fig. 11 is a similar view showing additional back rounding rollers;

Fig. 12 is a perspective view of the blocking mechanism for the corner cutting rollers;

Figure 39:
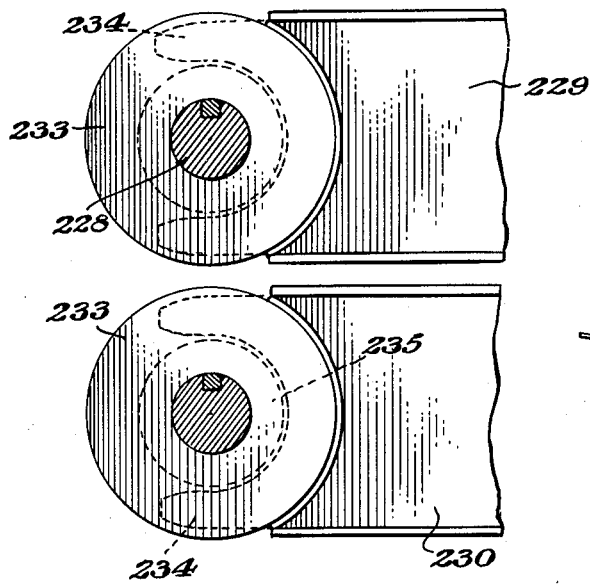
Figure 42:
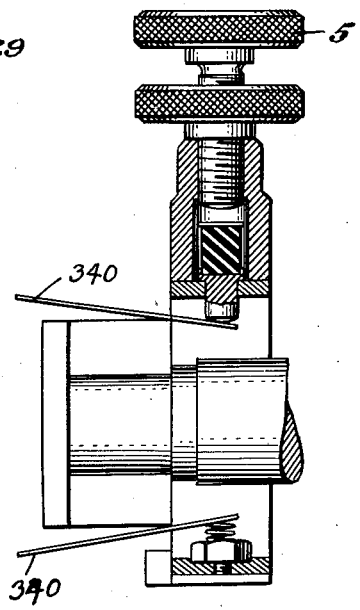
Figure 40:
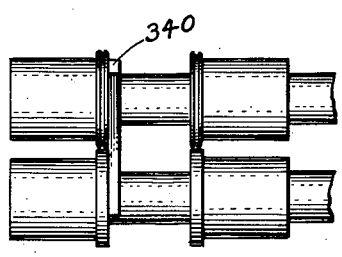
Figure 41:
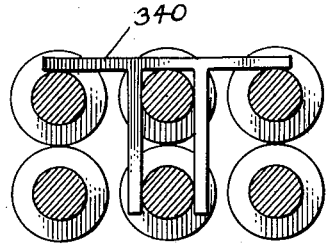

Figs. 12 to 21 inclusive are enlarged views illustrating the cutting, indenting and folding operations upon the bookbinding case;

Fig. 22 is a side view of the control means for the corner cutting;

Fig. 23 illustrates the wiring diagram;

Fig. 24 is a side view with portions cut away illustrating the gluing arrangement;

Fig. 25 is a cross-sectional view with parts in elevation of the gluing arrangement;

Fig. 26 is a side view of the folding device;

Fig. 27 is a cross-sectional view of a detail;

Fig. 28 is a partial plan of a sheet illustrating the extent of cutting at the corners;

Fig. 29 is a cross-sectional view of the folding device of Fig. 26 at the end of the folding;

Fig. 29a is a similar view at the beginning of the folding;

Fig. 30 is a plan view of the means for setting the corner switches;

Fig. 31 is front view thereof;

Fig. 32 is a cross-sectional view thereof;

Fig. 33 is an end view of a book block and cover;

Fig. 34 is a view similar to Fig. 30 on an enlarged scale;

Fig. 35 is a diagrammatic plan view illustrating the determination of book case measurements;

Fig. 36 is a side view for the same purpose;

Fig. 37 is a perspective view for the same purpose;

Fig. 38 is a flow sheet which shows diagrammatically the successive operative steps to which a cardboard is subjected for the purpose of manufacturing a finished case;

Fig. 39 illustrates the mounting of the chain beams;

Figs. 40, 41 and 42 illustrate respectively side and cross-sectional views for aligning shafts and reinserting the shafts.

In the various views similar reference characters indicate like parts.

The various steps to which a cardboard sheet is subjected in order to prepare a finished bookbinding case is shown in Fig. 38 in eighteen positions. Starting from position 1 a quadrangular sheet of cardboard is cut to approximately the correct size from a suitable web of material. During the continuous movement of such sheet longitudinally through the machine the two leading corners of the sheet are first cut off as shown in position 2 and immediately thereafter the trailing corners as shown in position 3.

Then if necessary the sheet is trimmed along the side edges as shown in position 4 by cutting off a narrow strip. Thereafter as a preparation for the folding of the longitudinal edges of the sheet upon the body an indentation is provided between the centers of the cut off corners located at the same longitudinal edge of the sheet as shown in position 5. Then an adhesive is applied to the sheet in position 6 on either side or on one side alone of the two indentations. Thereafter the longitudinal edges of the sheet with the indentation lines serving as a folding line are folded over as shown in position 7 and pressed against the body of the sheet. The longitudinal folded edges as shown in position 8 are firmly pressed upon the body of the sheet and then the sheet leaves the machine.

Upon adjusting the various elements in the machine to the new width the sheet is turned 90° and again introduced into the machine as shown at position 9. The sheet is then trimmed to measure if necessary by cutting off narrow strips along the side edges as shown in position 10. Then an indentation is provided along the side edges of the sheet preparing them for the folding operation as shown in position 11. Thereafter an adhesive is applied along the indentations as shown in position 12 after which the edges are folded along the position 12 after which the edges are folded along the indentations as shown in position 13 and pressed firmly to the body of the sheet as shown in position 14.

The sheet as shown in position 14 is now provided with a double edge upon all four sides and continues moving through the machine where it is subjected to a series of operations for forming the back portion of the binding case. The back portion is at first rather weakly subjected to rounding operations as shown in position 15 and then still more vigorously subjected to rounding operations as shown in Figs. 16, 17 and 18 so that finally the bookbinding case leaves the machine in a completely finished state.

The structural elements of a preferred embodiment of a machine for carrying out the above operations successively and with the greatest exactitude will now be described with reference to the other figures of the drawings.

The material from which the flexible covers can be made may be either paperboard, book binders linen laminated on paper, artificial leather, plastic coated board, or similar material. The material, however, should have a certain degree of stiffness. As a rule the weight per square meter should be between 325 and 425 grams but higher or lower weights may also be satisfactorily used in which case the machine would require certain minor adjustments. The best results have been obtained with materials weighing between 350 and 400 grams per sq. meter.

The quality of the paper board used is of course important for the production of good durable book covers. It is plain that an ordinary coated board of 350 to 400 grams which may be beautifully printed would give an attractive cover but could not be compared in strength with a cover made of a plastic coated or an embossed and colored natron-kraftboard. A very nice result may be obtained with plastic or cellophane coated materials. Plastic coatings have special advantages due to being washable for books which are in constant use such as school books, text books, cook books, etc.

The limits of the sizes workable upon the machine shown are as follows:

|                                    | Mm.  |
|------------------------------------|------|
| Largest bookcover height           | 620  |
| Smallest bookcover height          | 105  |
| Largest bookcover circumference    | 1000 |
| Smallest bookcover circumference   | 140  |
| Largest bookcover back             | 85   |
| Smallest bookcover back            | 7    |

The back scoring rollers for still smaller backs should be modified.

Referring particularly to Figs. 1, 1a, 2, 2a, 3, and 3a the main features of the machine are as follows: 1 indicates the feeding table for receiving the sheets to be fed to the machine and 2 are the feed rollers. The flattening rollers are indicated at 3 and the corner cutting rollers at 4. The bolts for regulating the pressure between the various rollers are shown at 5 and the apparatus for controlling the cutting of the corners at each end of the sheet is indicated generically at 6.

The supporting belts are shown at 7. Corner cutting switches are indicated at 8 and the rectifier for the current used in driving the machine is indicated at 9. Cutting and scoring rollers are shown at 10 and 11 indicates the gluing apparatus, 12 the drying apparatus and 14 the folding means. The pressure rollers 15 follow the folding devices and 16 indicate the rollers for providing a decorative scoring line. 17 shows a spare set of rollers for use if additional decorative lines are desired. Following the rollers 17 are the back portion scoring rollers 18, 19 and 20. 21 indicates the guides for the completed cover and 22 the collector for the completed covers. A waste collector is shown at 23 and 24 is a hand wheel for controlling the height of the cover. A hand wheel 25 regulates the width of the back portion and 26 is a scale for the height of the bookcover and 27 indicates an air pump. The gear drive is shown generally at 28 which is driven from the motor 29 by the belts 30. Levelling bolts for the frame are shown at 31 and the foundation plates are shown at 32. Pressure plates are indicated at 33 and the front gear box is shown at 34 while the rear gear box is shown at 35. 36 are guiding strips and 37 is a scale for the book cover width.

The feed rollers at the entry of the machine indicated generally at 2 are shown in Fig. 4 and comprise the upper rollers 282 and 283 mounted longitudinally adjustably upon the shaft 222 and the lower cooperating rollers 284 and 285 mounted longitudinally adjustable upon the shaft 223. The upper rollers 282 and 283 have secured thereto keys 286 secured to the rollers by means of the screws 287 and the keys 286 are disposed in the keyway slot 288 extending longitudinally of the shaft 222.

A feeding surface 289 is secured to the upper rollers and cooperates with a plain surface 290 upon the lower rollers.

The flattening rollers are shown upon Fig. 6 and comprise the upper rollers 269 and 270 mounted adjustably upon the shaft 271 by means of the keys 272 and the screws 273. The keys 272 slide in a key slot 274 extending longitudinally of the shaft 271. The lower flattening rollers 275 and 276 are mounted upon the shaft 277 by means of the keys 278 and the screws 279. The upper flattening rollers 269 and 270 have secured thereto the ring shaped flattening profiles 280 and the lower flattening rollers have the cooperating profiles 281.

The corner cutting rollers are shown at 4 in Fig. 3 and comprise the cutting elements 339 mounted upon rollers similarly constructed to the other rollers.

The corner cutting control

The main portion of the corner cutting controlling apparatus 6 is the coupling 47, see particularly Figs. 1 and 22, which has been specially designed for this purpose.

As a proper functioning of the apparatus is essential for the correct spacing of the front and rear corners of the flat sheet the operator will be able to adjust the apparatus in case of improper functioning.

The operation is as follows: The flat sheet in its movement switches on the current by moving the lever 48 of the first switch (see Fig. 23). The magnet 49 in the casing 50 is then energized, and the armature 51 with the lever 52 is drawn against the core 53. The lever 54 is now swung upwardly whereby the catch 55 is withdrawn from the teeth of the ratchet disc 56 located in back of the cam disc 57. The coupling will now turn 120°.

The same action takes place with respect to the other catch 55' which is controlled by the other magnet 49' under the control of the lever 48' located in casing 50' and which cooperates with the lever 54'. In this case however the coupling only rotates 60°.

The cam disc 57 located in front of the ratchet disc 56 returns the levers 54 and 54' to their original positions by acting upon the cam rollers 58 and 58'.

There is a possibility that because of residual magnetism the armatures will not leave their respective cores. The result then would be that the levers 54 and 54' would not be blocked by the catch of the core and would go past its stopping point. The cycles of 120°, 60°, 120°, etc. would then be interrupted and would have to be manually regulated.

In order to prevent this the armatures of the magnets have been provided with the spring blades 59 and 59'. On the lever 54 a pin 60 has been provided so that when the lever 54 rises the beam 60 will strike the spring blade 59 which will agitate the armature 51 thereby shaking it loose from the core. The pin 60 should only touch the spring blade 59 when the pawl or catch 55 is just clear from the ratchet disc 56.

The construction of the corner cutting switches generically indicated at 8 is shown more particularly in Figs. 30, 31, 32 and 34. In Fig. 30 switches A and B are shown attached to the blocks 66 and 67. The block 68 together with the blocks 66 and 67 serve as a rest for the scale 37 for the height of the book cover. The blocks 66, 67 and 68 are mounted upon the fixed chain beam. The block 68 is positioned at a fixed place and should not be moved while the blocks 66, and 67 are adjustable.

The switches A and B are microswitches which are provided with operating buttons 69 actuated by the pivotally mounted swinging levers 70 of the form particularly shown in Fig. 31. One of the leads 71 to the switch button 69 is provided with a sliding contact 72 contacting the conducting strip 73. The lead 71 from the switch B contacts the strip 74 for a similar sliding contact 72.

A pivotally mounted contact lever 75 pivoted at 76 and having a nose 77 is designed with the shape shown so that upon contacting a sheet being fed through the machine it will be pivoted anticlockwise and thereby swing the lever 70 in clockwise direction so as to momentarily actuate the button 69 closing the circuit momentarily. Such closing of the circuit will energize the magnet 49. The nose 78 of the lever 75 will immediately pass beyond the nose 79 of the lever 70 and allow the lever 70 to return to the position shown in Fig. 31 where the circuit is broken. Upon passage of the end of the sheet the nose 77 will drop down to the position shown in Fig. 31 and the nose 78 thereof will resume the position shown in such figure since it can easily pass by the nose 79 of the pivoted lever 70. A small return spring 80 fixed at one end to the switch A and at the other end to the lever 75 maintains the lever 75 normally in contact with the stop pin 81. The lever 82 of the switch B operates similarly but is provided with a slightly different shaped nose 83 at the end contacting the sheet.

Since during the cutting the corner cutter shafts may not be deflected a supporting bearing has been attached to the adjustable chain beams. As with the pressure bolts we may increase the spring pressure by turning the nuts under the bearing.

The corner cutter shaft rests in off position on two adjustable points under the bearer housings in the frame while also both moving bearing halves of the supporting bearing rest upon each other.

When the top corner cutter shaft rotates the corner cutting rollers contact with the cutting edges on the hardened steel counter rollers and the spindle is lifted about 0.2 mm. against the spring pressure so that the cutting takes place under full pressure.

The blocking mechanism is shown in Fig. 12. Without this mechanism the corner cutter shaft in off position would be in constant vibration which would result in irregular operation.

A roller bearing 61 is mounted in a flexible holder 62 whose pressure can be regulated by means of the bolts 63 and nut 64. The roller bearing 61 is always located at a slight angle to the blocking disc 65 at each 120° and 60°. The coupling is thereby withdrawn from any vibration and the shaft will always come to a positive rest position.

After cutting the corners upon the flat sheet the sheet is trimmed and the bending or folding score is made at the same time thereon in order to secure an even folding. The rollers indicated generically by 10 are shown in Fig. 5 and an enlarged view of the operation carried out thereby is shown in Fig. 13.

The upper rollers 291 and 292 are secured to the shaft 293 by means of the keys 294 and screws 295. Mounted upon the upper rollers are the scoring elements 296 and cutting elements 297. The scoring elements and cutting elements may be secured in any desired fixed way to the upper rollers 291 and 292. The keys 294 are located in a keyway 298 extending longitudinally of the shaft 293.

The lower rollers 299 and 300 cooperate with the upper rollers and have mounted thereon a cooperating scoring element 301 and a cooperating cutting element 302. The rollers 299 and 300 are mounted in a similar adjustable way upon the shaft 338.

*The gluing apparatus*

The gluing apparatus is indicated generally at 11 in Fig. 1 and is shown more particularly in Figs. 24 and 25.

The container for the glue is shown at 84 which has a tube 85 preferably of rubber or a suitable plastic extending from the bottom thereof into the reservoir 86. A clamp or lock 87 encircles the tube 85 so that the flow of glue through the tube 85 may be cut off and the container 84, tube 85 and clamp 87 may be removed from the holder 88 as a unit and the container refilled with glue. When the bottle has been refilled and replaced in the holder 88 the lock or clamp 87 may be opened and the glue will run from the bottle to the reservoir 86 where it will reach a level as high as the opening 89 of the tube 85. Atmospheric pressure will maintain the level of the glue in the reservoir 86 at the required height.

A glue applying roller 90 extends at its lower end into the glue in the reservoir 86. Such applying roller is tilted as shown particularly in Fig. 25 and the spindle 91 thereof has a universal mounting 92 at each end thereof. The forward end of the forward universal mounting 92 is formed by a bolt 93 extending through the front wall of the reservoir 86. A set screw 94 cooperates therewith for setting the bolt 93 in adjusted position. Extending around each reservoir 86 are the branch air pipes 95 and 96. Coming from the air line 97 connected to the air pump 27 the air pipe 95 is provided with a nozzle 98 and the front air pipe 96 is provided with a nozzle 99 under the control of a valve 100 operated by the handle 101. The nozzle 99 may be easily removed from the branch air pipe 96 by a removable connection 102.

Cooperating with the glue applying roller 90 are the pressure rollers 103 which are mounted upon a plate 104 adjustably secured by the screws 105 to the chain beam 229.

The reservoirs 86 are adjustably mounted upon the chain beam 230 by means of the slotted extensions 106 and the screws 107.

As a general rule the reservoirs 86 are adjusted so that the rollers 90 have their upper surface extending about 1 mm. above the level of the sheets traversing the machine and the pressure rollers 103 located upon each side of the applying roller 90 are adjusted so that their lower surfaces extend about 1 mm. under the level of the sheets traversing the machine.

The front air pipe 96 directs a current of air by its nozzle 99 towards the revolving roller 90 and regulates the thickness of the film of glue applied to the sheets. This amount may be regulated by a manual adjustment of the valve 100 by the valve handle 101. Furthermore due to the detachable connection 102 the nozzle 99 may be easily removed for cleaning purposes.

The rear air pipe 95 with its nozzle 98 has a double function. When a sheet leaves the gluing applying rollers a drop of glue is carried along and this drop is atomized by the air coming from the nozzle 98 and at the same time the air dries the glue slightly. The air under pressure is controlled from a switchboard by the switch 41 shown in Fig. 23.

It is essential to shut off the flow of air whenever the machine is stopped momentarily in order to prevent drying of the glue at one particular point. It is also essential to use a tested solution of glue containing 30% latex and 70% ammonia.

A heating element 12 is located at each side of the advancing sheet immediately following the gluing apparatus and the heating elements 108 (see Fig. 1) are mounted upon a plate 109 provided with slots 110 receiving the screws 111 whereby the position of the heater or drier may be adjusted with respect to the glued edges of the sheets 45. A protecting grill 112 is secured over the heating elements and the heating current is controlled from the switch 40 upon the keyboard.

The heating element 12 is designed to partially dry the glue applied to the edges of the sheets 45. Although the drier 12 is adjustably mounted by means of the screws 111 it is seldom necessary to do so since the quantity of glue may be better regulated by means of the air blowers on the gluing rollers.

The folding mechanism

After passing the drier 12 the sheet enters the folding mechanism indicated generally at 14 and shown more particularly in Figs. 14, 26, 29 and 29a.

A right angular plate 113 is secured to the chain beam 229 by means of the bolts 114 extending through key hole slots 115 in the plate so that the entire folding mechanism may be easily removed for cleaning purposes. On the horizontally extending portion 116 of the plate 113 there is secured a longitudinally extending bar 117 through which extend vertically the adjusting bolts having the milled knobs 118. Secured to such bolts at their lower ends 120 by threading is another right angular plate 119. Slots are provided in the portion 116 which extend at right angles to the frame. Extending through the bar 117 at right angles to the frame are the adjusting bolts 121 having the milled knobs 122. The milled knobs 122 extend through slots 123 provided in the vertically extending front flange of the plate 119. Secured to the underside of the plate 119 is the folder 124. Fig. 29a shows a cross-section with parts in elevation of the folding mechanism at the beginning of the folding and Fig. 29 shows a cross-section at the end of the folding operation. As seen in Fig. 26 the folder 124 gradually leads the turned over edge into its finally folded form. Fig. 14 illustrates a cross-section of the folding upon an enlarged scale at approximately the half way point.

By adjusting the milled knobs 118 and 122 the folder 124 may be adjusted both vertically and horizontally with respect to the frame.

The folding edge must have a width of at least 7½ mm. from the folding crease or the effect of the flexible round edge is lost as shown in Fig. 14.

The pressure rollers indicated generally at 15 in Fig. 3a are shown more particularly in Fig. 7 and Fig. 15 wherein Fig. 15 illustrates a slight modification of the contour of the pressing sections. In Fig. 7 the upper pressing rollers 125 are secured to the shaft 126 by keys 127 secured to the rollers by screws 128. The keys 127 travel in a keyway slot 128 extending the length of the shaft 126. The contour pressure rollers 130 and 131 are mounted upon the lower shaft 132 by similar keys 133 secured by screws 134. The keys 133 slide in the longitudinally extending slot 135 of the shaft 132. The upper rollers 125 have a pressing contour 136 which reacts with a rubber insert 137 upon the counter pressure rollers 130 and 131.

In the construction shown in Fig. 15 the pressing contours are slightly changed as shown at 138 for the contour upon the upper rollers and at 139 for the contour upon the lower rollers. In this form the rubber insert 137 has been eliminated. The pressing rollers fold down the edges of the sheet and press them firmly together so that the glued edges are firmly adhered to the body of the sheet 45.

The decorative scoring rollers are shown generally at 16 in Fig. 3a and more particularly in Figs. 8 and 18.

As shown in Fig. 8 the upper scoring rollers 140 are secured longitudinally adjustably upon the shaft 141 by means of the keys 142 secured by the screws 143. The keys 142 slide in the keyway slot 144 of the shaft 141.

The coacting rollers 145 are adjustably secured to the lower shaft 146 by means of the keys 147 secured to the rollers by the screws 148. The keys 147 slide in the keyway slot 149 provided in shaft 146. The upper scoring rollers carry the scoring rings 150 while the lower rollers 145 carry the cooperating rings 151. The rings 150 are each provided with a pair of spaced scoring ridges 152 while the lower rollers are provided with a groove 153 designed to cooperate with the inner ridges 152 as shown more particularly in Fig. 18.

The scoring apart from being decorative also strengthens the round edge and makes it more flexible. The necessity of having a width of at least 7½ mm. for the turned in border becomes apparent since the crease on the inside of the book cover serves as a guide for an edge of the fly leaf.

The back scoring rollers

The back scoring rollers are indicated generically in plan view in Fig. 3a at 18, 19 and 20 and more detailed views thereof are shown in Figs. 10, 11, and 9. Some of the operations accomplished on the sheet are shown in enlarged views in Figs. 16, 17, 20 and 21.

The first back scoring rollers indicated generally at 18 and more particularly in Fig. 10 comprise the upper rollers 154 and 155 mounted upon the shaft 156 by means of the keys 157 and the screws 158. The keys 157 travel in the keyway slot 159 extending longitudinally of the shaft 156. The rollers 154 and 155 have the scoring elements 160 and 161.

The cooperating rollers 162 and 163 are mounted on the shaft 164 by means of the keys 165 and the screws 166. The rollers 162 and 163 have the cooperating scoring elements 167 and 168 cooperating with the elements 160 and 161 of the upper rollers.

The action accomplished upon the sheet 45 by the first back scoring rollers is illustrated in Figs. 16 and 20. These rollers give the necessary scope for the next step. With strong qualities of board these rollers are mounted closely adjacent the following back scoring rollers so that the board is scored in two directions thereby giving the back great flexibility. When weaker types of cardboard are used only one score should be given.

The following scoring rollers are shown in Fig. 11 and are indicated generally in Fig. 3a by 19. This set of back scoring rollers comprises the upper rollers 169 and 170 mounted adjustably upon the shaft 171 by means of the keys 172 and the screws 173. The keys 172 slide in the keyway slot 174 extending longitudinally of the shaft 171. The scoring element upon the roller 169 is 175 and that upon the roller 170 is 176.

The cooperating rollers 177 and 178 are mounted upon the shaft 179 adjustably by means of the keys 180 and the screws 181. The cooperating scoring element on the roller 177 is 182, and that upon the roller 178 is 183.

From back scoring rollers 18 the sheet travels to back scoring rollers indicated generally at 20 in Fig. 3a and more particularly in Fig. 9. In this construction the upper rollers 184 and 185 are mounted upon the shaft 186 by means of the keys 187 and the screws 188. The shaft is provided with a longitudinally extending keyway slot 189 for the keys 187. The rollers 184 and 185 have the scoring profiles 190 and 191.

The cooperating rollers 192 and 193 are secured to the shaft 194 by means of the keys 195 and screws 196. The keys 195 travel in the keyway slot 197 of the shaft 194. The roller 192 has a scoring profile 198 and the roller 193 has a scoring profile 199 which cooperates with the profiles 190 and 191 of the upper rollers. The construction of the scoring components of these rollers is such that the board is flattened on the side of the book as shown in Fig. 21 while the other side towards the back of the cover is left untouched. In Fig. 17 is illustrated how the score is flattened at its deepest point by the scoring elements of rollers 19.

The guiding rollers

The guiding rollers 335 as shown in Fig. 3a are mounted on both sides of the back creasing rollers and should always be in the position as shown in Fig. 19. They serve to press the folded border firmer together without damaging the flexible edge. The left hand rollers 335 need only to be adjusted once.

The motor 29 is mounted adjustably upon the frame of the machine by means of the slotted hangers 200 and 201 cooperating with the bolts 202 and 203 respectively. By this mounting the belts 30 may be tightened as desired. The belts 30 drive the pulley 204 fixed to the shaft 205 at the other end of which is keyed a gear 206 which meshes with the gear 207 for driving the various gear assemblies attached to the various shafts carrying the rollers. The gear ratio may be easily changed by interchanging the gears 206 and 207 or inserting other gears with different ratios.

The gears 206 and 207 are enclosed within the gear box 312 with the cover thereof easily removed by means of the bolts 313 for changing the ratio between the gears 206 and 207 so as to increase or decrease the feed of the machine.

The gear 207 is fixed to the main drive shaft 314 which carries a series of worm gears 315, 316, 317, and 318.

The worm gear 315 drives the gear 319 keyed to the shaft 179 of the back forming assembly 19 and the gear 320 upon such shaft meshes with the gear 321 keyed to the shaft 171 for the upper rollers. Also meshing with the gear 319 are the idler rollers 322 and 323 in order to transmit a rotation in the same direction to the gears 324 and 325 associated with the shafts of the last back forming rollers 20 and gears 326 and 327 associated with the back forming assembly 18.

The worm 316 meshes with the gear 328 which is fixed to the lower shaft of the superposed shafts 329 upon which are mounted the pulleys 233 for the supporting bearings or chains 7. In this way the supporting chains are driven in proper sequence with the remaining elements of the machine.

The worm gear 317 meshes with the gear 330 which drives the various gears associated with the elements 15, 16 and 17 in the same manner as above described with respect to the drive of the back forming elements 18, 19 and 20.

The worm 318 meshes with the gear 331 fixed to the shaft 338 and a similar driving arrangement is provided therefrom for driving the assemblies 3, 10 and 4. The drive of the gear 227 which meshes with the gear 226 upon the feeding rollers 2 is accomplished through the chain belts 7 and the pulleys 233 from gear 328 meshing with worm gear 316.

Secured to the foundation plates 32 are the side panels 208, with the doors 209 for entry to the waste collector 23. Uprights such as 210 shown in Fig. 25 are located inside the panels and are secured to the foundation plates in any desired way for supporting the main longitudinal beams 211 located upon each side of the machine for supporting the various elements thereon. On the supporting beams 211 a series of double bearings are mounted such as 212 and 213 in Fig. 4 at one side and 214 and 215 at the other side. The lower bearings such as 213 and 215 are fixed immovably on the supporting beams 211 and in such case can be disposed in vertically extending spaced slots 216 as shown in Fig. 2 provided in a side plate 217 which in turn is fixed to the supporting beam 211 or may be integral therewith.

The upper bearings such as 212 and 214 are vertically adjusted and yieldingly urged against the lower bearings 213 and 215. This is accomplished by means of a pressure beam 33 extending across the top of the plate 217 as shown in Fig. 2 with the bolts 5 as shown more particularly in Fig. 4 extending through a cap 218 and bearing upon a rubber block 219 which in turn bears upon a pressure plug 220 which at its lower end presses upon the upper surface of the bearings 212 and 214 whereby the pressure existing between the two superposed bearings may be adjusted. A set screw 221 cooperating with the bolt 5 allows locking the parts in adjusted position.

The various shafts upon which the cutting and scoring elements are mounted such as shafts 222 and 223 in Fig. 4 extend at one end beyond the bearings 214 and 215 respectively as far as may be necessary in order to have keyed thereto the various driving gears. Shaft 222 has keyed thereto the gear 224 which meshes with the gear 225 keyed to shaft 223. Shaft 223 extends further and has in addition keyed thereto driving gear 226 which is driven by gear 227 keyed to shaft 228 of the flattening roller assembly 3 which is driven by means to be later described. Extending between the two series of double bearings are the parallel chain beams 229, 230, 231 and 232, see Fig. 7. The chain beam 229 is superposed above the chain beam 230 and the chain beam 231 is superposed above the chain beam 232. The chain beams serve to carry the supporting chains 7 which transport the sheet through the machine.

The chain beams are mounted at each end as shown in Fig. 39. At their ends the chain beams are provided with belt pulleys 233 which are keyed to the shafts such as shaft 228. The beams are provided with forked ends 234 which engage the reduced portion 235 of the pulleys 233 for support. The conveying chains extend as shown in Fig. 7 through trough like guiding plates 236 secured to the chain beams 229, 230, 231 and 232. The intermediate lengths of the chains 7 travel in the same direction and feed the sheet through the machine.

The chain beams 229 and 230 are interconnected in any desired manner so that while the chain beam 229 is adjusted vertically above the chain beam 230 no relative movement between the chain beams 229 and 230 is possible transversely or longitudinally. This may be accomplished by a slide rod fixed to the lower chain beam and slidable in a slide or slot in the upper chain beam. A similar construction is provided for the chain beams 231 and 232.

It is also essential that the pairs of chain beams should be relatively movable transversely of the machine in order to accommodate the numerous changes in widths which occur in different bookcases and in the same bookcase. Looking from the inlet end of the machine the left hand pair of chain beams are preferably fixed in position while the right hand pair are movable transversely of the machine. This is accomplished by means of the screws 237 and 238. The screw 237 has fixed thereto the hand wheel 24 at one end and the other end rotates freely in a socket 239 fixed in a beam 211. The shaft of the screw 237 projects beyond the beam 211 and has fixed thereto a sprocket gear 240 which is connected by the chain 241 to a sprocket fixed to the screw 238. In this manner both of the screws 237 and 238 are rotated in unison and in the same direction upon turning the hand wheel 24. The screw 237 passes through a threaded collar 243 fixed in chain beam 232 and the screw 238 passes through a threaded collar 244 fixed in the same chain beam. The pulleys 233 on the shaft 228 are keyed thereto so as to slide longitudinally thereon. Movement of the chain beams transversely of the machine requires a loosening of the various rollers mounted upon the different shafts and then a resetting of such rollers after the position of the chain beams and the chain belts 7 has been established.

A coordinated movement of the back rounding rollers in the back rounding section is accomplished as follows. On the screw 238 a second sprocket gear 245 is fixed over which runs a chain 246 to the sprocket gear 247 fixed upon screw 248, see Fig. 11. The screw 248 is rotatably mounted at each end in the side beams 211 and cooperates with a threaded socket 249 having a longitudinally extending flange 250 on its upper portion which rides in the circular groove 251 provided in the lower back rounding rollers. The screw 248 has an unthreaded portion 252 which rotates in an unthreaded socket 253 having an upwardly extending flange 254 which rides in the groove 255 provided in the left hand series of lower back rounding rollers. By providing a proper ratio between the sprocket gear 247 and the sprocket gear 245 a properly coordinated movement between the back rounding rollers and the other rollers in the machine may be obtained.

In order to secure a relative movement between the back rounding rollers upon the same shaft the screw 248 also threads into a collar 256 and such collar has downwardly extending lugs 257 and 258 which are apertured to receive the central portion of an oppositely threaded bolt 259. Fixed to the bolt 259 between the lugs 257 and 258 is a gear 260. The oppositely threaded ends 261 and 262 of the bolt 259 are threaded into a downwardly extending lug 263 upon the collar 253 and a dowwardly extending lug 264 of the collar 249. The gear 260 is secured to the bolt 259 by a set screw. Rotation of the gear 260 therefore will cause relative movement between the collars 253 and 249 and thereby space the back forming rollers as desired. When so spaced movement of the screw 248 will properly coordinate the movement of the assembly with the operating elements in the forward part of the machine. A belt tightener 265 is provided for the chain 241 and a belt tightener 266 is provided for the chain 246.

A gear 267 (see Fig. 9) meshes with gear 260. The gear 267 is fixed on the shaft 268 which is suitably journaled in the machine and upon which the hand wheel 25 is fixed.

The main electrical line 38 is connected as shown in Fig. 23 to the switch board indicated schematically at 39 and then the switches 40, 41, and 42 may be connected to the heating or drying apparatus 12, the air pump or blower 27 and to the control for the corner cutting of the sheet indicated generically at 43.

The following should be observed before placing the machine into operation. The entire machine should be cleaned, the rubber blocks on the transportation chain and the rubber transporting rollers should be cleaned with gasoline. The rubber pad should be dusted with steatite powder. The worm gear boxes 34 and 35 should be filled up to the driving shaft with a medium to heavy machine oil.

It may be necessary that certain rollers should be cleaned, replaced or sharpened and therefore the dismounting of the shafts has been made quite simple so that a minimum of time is required for such changes. This is done by making a special construction of partitioned shafts which parts fit into each other by a simple claw clutch.

The shafts are preferably constructed as shown in Fig. 5 as separable by means of the pin and slot construction 309 so that any particular shaft may be easily removed and replaced without completely demounting the machine. Also all the shafts are mounted upon ball bearings such as 310 at both ends.

The strips 36 may be removed after which the shaft may be removed from the frame together with the left ball bearing housing as seen from the feeding end. Then for reinstalling the shaft it is pushed into the frame again up to the ballbearing housing after which the latter is mounted by means of tool 340 as shown in Fig. 42.

As seen in Fig. 3 a bar 303 secured in any desired way to the chain beam 231 aligns the various rollers upon the different shafts with such chain beam. A similar aligning bar 304 secured to the lower chain beam 232 performs the same service for the lower rollers. At the left hand side an aligning bar 305 secured to the chain beam 229 performs a similar service for the rollers enclosed therein. A similar bar 306 is provided for the lower series of rollers. Similar aligning bars 307 and 308 are provided for the pressure rollers 15, decorative scoring rollers 16, and whatever rollers are provided upon the spare rollers 17.

In Fig. 25 the mount for the corner strippers is illustrated at 311.

Upon the feed table 1 adjustable guides 332 are provided which may be fixed in adjusted position by means of the bolts 333 cooperating with the rod 334.

Guiding rollers 335 are provided upon the shafts of the back forming rollers 18, 19 and 20 having a configuration more particularly shown in Fig. 19 wherein the upper guiding rollers 335 have fixed therein a resilient contacting surface 336 which contacts the folded edges of the blank in the manner shown in Fig. 19 so that during the back forming process the folded edges of the sheet are not distorted or damaged.

The gear boxes are protected by a removable cover element 337.

With regard to the cover collector 22 the supports attached to this collector are placed in corresponding holes of the squares on the shaft at the end of the machine. The bolts in these squares serve both to regulate the correct angle of the collector as well as to fix it in place.

The cover guides 21 are mounted on a frame by means of bolts supplied on the frame.

The feeder guides on the feed table 1 are mounted on the square rod parallel to the shafts.

In adjusting the pressure the pressure bolts 5 adjust the resilient shafts in accordance with the quality of paper or board used.

After the sheet has passed the feed rollers 2 it is flattened by the flattening rollers 3 in order to eliminate the bulking of the edge during the folding operation. This also facilitates the pasting in of the fly leaf. An enlarged showing of the action which takes place is illustrated in Fig. 27 where the upper flattening roller is provided with a slightly elongated arc shaped portion 44 in order to modify the edge of the sheet 45 as shown.

The corner cutting rollers 4 are mounted upon periodically rotating shafts. As the sheet 45 controls the movements of the shafts by means of two switches, magnetos and a coupling the corner cutting rollers 4 are alternately rotated 120° and 60° and thereby cut off the corners of the flat sheet.

Theoretically the distance between the sheets 45 fed could be one inch but in practice this distance should be at least two to two and one half inches as the ratchet gears have to come to a momentary standstill.

The corner cutting of the sheet is independent of the speed of the machine and the size of the sheet since the corner cutters are operated only under the control of the sheet itself contacting the controlling switches.

Furthermore the corner is not entirely cut off, see Fig. 28 but a cut 46 is made therein which extends closely to the edge of the sheet. The corner therefore is still attached to the sheet but then upon the following operations by the cutting and scoring rollers the corner is detached and will drop off or be stripped off by the corner strippers.

The pressure regulating bolts 5 control the pressure springs by which the corner cutters are pressed against the hard steel counter rollers. A proper degree of pressure is essential.

As mentioned above the corners are not cut off cleanly entirely since for this purpose a sharp knife would be required which would be blunted immediately upon a simple cut. The corners remain attached by a few fibers but are stripped off later by the corner strippers.

If after long use the corner cutters would not sufficiently cut off the corners so that the strippers could operate properly the pressure of the springs can be increased by rotating the bolts 5.

*Operation*

Reference is made to Figs. 33, 35, 36 and 37 for the operation in constructing a book case. It is of importance to carefully follow the example given below particularly when operating with printed covers since a wrong calculation may result in the following:

a. The cover will be too small.
b. The trimming of the flat sheets will be too little.
c. The book blocks will have to be trimmed down.

For example to make a flexible cover for a book of the following dimensions:

A. Book block height 210 mm.
B. Book block circumference 320 mm.
C. Size of book block back 20 mm.

An overlay M of 3 mm. is taken. The width of the strips to be cut off D is dependent on the size of the sheets from which the flat cover is to be formed. It is suggested that one should never take less than 3 mm. off-cut and never more than 7 mm.

Then the following is obtained:

| | Mm. |
|---|---|
| A, the height of the book block | 210 |
| M, the overlay 2×2½ mm | 5 |
| E, the thickness of the crease of the folder 2×2 mm | 4 |
| F, the fold in 2×7 mm | 14 |
| D, the off-cut 2×3 mm | 6 |
| The height of the flat sheet N is then | 239 |

The overlay M is calculated on 2½ mm. since the pressure of the flattening roller expands the board about 1 mm. overall so that the actual result is an overlay of 3 mm.

The height of the book cover will be:

| | Mm. |
|---|---|
| A, the height of the book block | 210 |
| M, the overlay 2×3 | 6 |
| | ¹216 |

¹ Equals the height of the cover.

On the scale 26 see Fig. 3a the measurement G of Fig. 35 is set, namely: 210+2×2½=215 mm. 2×3 mm. is not taken because of the expansion of the sheet under pressure as set forth above.

When establishing the overall length of the flat sheet we must count on an extra 2 mm. or more for the scores of the back depending upon the thickness of the material used and upon the type of book back. The table will then show:

| | Mm. |
|---|---|
| B, overall circumference of bookblock | 320 |
| M, overlay 2×2½ | 5 |
| scores in back | 2 |
| E, thickness of fold in score 2×2 | 4 |
| F, fold-in, 2×7 | 14 |
| D, off-cut, 2×3 | 6 |
| | ¹350 |

¹ Overall length of flat sheet 0.

The same applies for the 2×2½ mm. as outlined above allowing for an expansion of 1 mm. under pressure.

The overall length of the book cover is then:

| | Mm. |
|---|---|
| B, the overall circumference of the book block | 320 |
| M, the overlay 2×3 | 6 |
| | ¹326 |

¹ Equals the circumference of the bookcover.

On the transverse scale 37, see Fig. 34, there is now set off 320 mm.+2×2½+2 (back scores)=327 mm.

We then obtain the following results:

| | Mm. |
|---|---|
| Size of flat sheet | 239×351 |
| Position of length scale | 215 |
| Position transverse scale | 327 |

It is essential that the direction of the fibers of the board should run parallel with the height of the book. This is also essential for the flexibility of the back scores.

On the scale guide on which the conductors are fixed at the feeder table we set the left conductor at 3 mm. to obtain the 3 mm. off-cut D.

The right hand guide is then placed against the sheet with a very narrow margin.

The setting scale 37 for the height of the book cover rests in 3 blocks A, B and C which are mounted on the fixed chain beam. Attached to the blocks A and B are the corner cutters switches. The block C has a fixed place and should not be moved. The correct place is indicated by two marks on the chain beam.

The place of the block A and therefore also the first corner cutter switch fixes the moment at which the corner cutter shaft will rotate and also the place of the corner to be cut.

The block A can be adjusted so that upon the second operation no strip will be cut off.

The moment in which the corner cutting shaft will rotate is not always the same but is dependent upon the speed of the machine.

With no off-cut the block A has a different place at each of the speeds of the machine.

The adjusting of the block A is now as follows:

Line 100 of the scale upon which block A is firmly mounted is opposite the speed 7.5 of the block C. This means that the corners will be cut off with the speed of 7½ M per minute and give no off-cut with the second operation. Since in the example given an off-cut of 3 mm. has been determined it is now necessary to shift the scale with block A a distance of 3 mm. (a in Fig. 34) in the direction of block C. This distance can be read from block B.

The position of block B is fixed on the scale at 327 mm. by placing the 7 of the scale on block B on the line 32 of the scale.

Following is a summary of the operations for the long side of the cover:

1. The left feeding guide is set at 3 mm.
2. By turning the hand wheel 24 the height of the book cover (215 mm.) is adjusted.

As the connecting chains of the chain beam transports for a slight tolerance, the last movement of hand wheel 24 must always be towards the left since otherwise the scores for the book back would not center.

Also before turning the hand wheel the back score and guiding rollers should not be blocked. Therefore loosen screws and move rollers aside, otherwise breakage may be caused.

3. Set the right feeder rollers in accordance with the left rollers.
4. Set the feeder guides on the appropriate width according to the flat sheet used.
5. Clean and make ready the gluing apparatus.
6. Set the corner cutter switches.
7. Put the moistening apparatus which may be of any desired type, not shown, for the back scores out of operation.
8. Switch on the main switch and the three additional switches, see Fig. 23.
9. Regulate the film of glue by means of the valve 101.
10. Test by hand the sequence of operation of the corner cutter switches.
11. Set the guiding rollers 335 as required.
12. See that the back scoring rollers are out of operation.
13. Adjust the cover collecting box to the size required.

To control the proper working use small strips of the same material and equal length. Test the left side feeder rollers first and then the right side.

The following should be controlled:

a. Distance of corners 327 mm.
b. Size of corner to end of plane sheet at book sides 12 mm.
c. Height of bookcover 216 mm.
d. Correct pressure.
e. Width of fold-in 7½ mm. Not more and not less, since by the flattening of the fold-in score the width of the fold-in has expanded ½ mm. on both sides of the sheet.

*f.* Proper gluing of edge.

*g.* Cut-off at book sides 3 mm.

*h.* Width of decorative scores.

The first flat sheet is then fed to the machine and if the result is in order production can start. The sheets should be fed in with a distance of 6 cm. between.

The operations for the short side of the cover are as follows:

1. Set right hand feeder guide in accordance with the size of the sheet on the new side after having determined the width of the strip to be cut off and having controlled the setting on the scale guide on the feeder table.

2. Set the right hand feeder rolls in the new correct position.

3. Loosen the upper back scoring rollers and the right hand roller and upper feeder rollers and move them aside.

4. Adjust the new size of 327 mm. with the hand wheel 24 on the transverse scale.

5. Set the corner cutter roller by operating the switches by hand.

6. Switch off the corner cutter switches.

7. The width of the back cover is taken as follows:

Width of back of cover=circumference of rounded bookblock back+1 mm. (in the example of 20 mm. so a total of 21 mm.).

The lower back scoring rollers are now set by hand wheel 25 on 21 mm. and then the upper back scoring rolls are set precisely above the lower rolls by means of the setting tool 340, see Figs. 40 and 41.

8. Set up back score moistening apparatus.

9. Adjust the collector box to the size of the book cover.

Then control again the proper functioning of the machine as described above. If necessary clean the gluing apparatus before starting operation.

The following therefore should be controlled:

A. The same points as outlined under the summary for the first operation.

B. Whether the corners fit exactly.

C. Whether the cover is precisely square.

D. Whether the back scores run parallel and are exactly in the middle.

E. Whether the back scores are not too sharp, especially near the fold-in.

F. Whether the moistening fluid has been properly brought on.

After approving the operation as to the control sheets the operation may be started.

Since there is no corner cutting necessary the covers may be fed into the machine uninterruptedly.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A machine for manufacturing an integral book case which extends over the front cover, back portion and back cover of the book to be bound comprising in combination operatively associated means for feeding individual sheets of flexible material, means for trimming said sheets to proper size, means for scoring said sheets parallel to the edge thereof, means for applying adhesive adjacent the edges of said sheets, means for controlling the amount of adhesive applied to said edges, means for folding said edges over against the body of said sheets, means for partially drying said adhesive, means for pressing said folded over edges against the body of said sheets, means for applying decorative scores to said sheets, means for scoring and rounding the back portion of said sheets, means for collecting completed covers, supports extending longitudinally through said machine, means for adjusting said supports in parallel spaced relation to one another, conveyor belts carried by said supports, means operatively associating said individual means, and means for adjusting the elements operating upon said sheets in coordination with the movement of said supports.

2. A machine for manufacturing an integral book case which extends over the front cover, back portion and back cover of the book to be bound comprising in combination operatively associated means for feeding individual sheets of flexible material, means for trimming said sheets to proper size, means for scoring said sheets parallel to the edges of said sheets, means for controlling the amount of adhesive applied to said edges, means for folding said edges over against the body of said sheets, means for partially drying said adhesive, means for pressing said folded over edges against the body of said sheets, means for applying decorative scores to said sheets, means for scoring and rounding the back portion of said sheets, means for collecting completed covers, supports extending longitudinally through said machine, means for adjusting said supports in parallel spaced relation to one another, conveyor belts carried by said supports, means operatively associating said individual means, and means for adjusting the elements operating upon said sheets in coordination with the movement of said supports and means for spacing said scoring means for the back portion.

3. A machine for manufacturing an integral book case which extends over the front cover, back portion and back cover of the book to be bound comprising in combination operatively associated means for feeding individual sheets of flexible material, means for trimming said sheets to proper size, means for scoring said sheets parallel to the edges thereof, means for applying adhesive adjacent the edges of said sheets, means operatively associating said individual means, and nozzles for supplying air under pressure cooperating with said adhesive applying means for controlling the amount of adhesive supplied to said sheets.

4. A machine for manufacturing an integral book case which extends over the front cover, back portion and back cover of the book to be bound comprising in combination operatively associated means for feeding individual sheets of flexible material, means for trimming said sheets to proper size, means for scoring said sheets parallel to the edges thereof, means for applying adhesive adjacent the edges of said sheets, means operatively associating said individual means, and nozzles for supplying air under pressure cooperating with said adhesive applying means for controlling the amount of adhesive supplied to said sheets, said nozzles being located upon each side of said adhesive applying means.

5. A machine for manufacturing an integral book case which extends over the front cover, back portion and back cover of the book to be bound comprising in combination operatively associated means for scoring individual sheets parallel to the edges thereof, means for applying adhesive adjacent the edges of said sheets, means for controlling the amount of adhesive applied to said edges, means for folding said edges over against the body of said sheets, means for partially drying said adhesive, means for pressing said folded over edges against the body of said sheets, supports extending longitudinally through said machine, means for adjusting said supports in parallel spaced relation to one another, conveyor belts carried by said supports, means operatively associating said individual means.

6. A machine for manufacturing an integral book case which extends over the front cover, back portion and back cover of the book to be bound comprising in combination operatively associated means for scoring individual sheets parallel to the edges thereof, means for applying adhesive adjacent the edges of said sheets, means for controlling the amount of adhesive applied to said edges, means for folding said edges over against the body of said sheets, means for partially drying said adhesive, means for pressing said folded over edges against the body of said sheets, supports extending longitudinally through said machine, means for adjusting said supports in parallel spaced relation to one another, conveyor belts carried by said supports, means for adjusting the elements operating upon said sheets in coordination with the movement of said supports, means operatively associating said individual means.

7. A machine for manufacturing an integral book case which extends over the front cover, back portion and back cover of the book to be bound comprising in combination operatively associated means for feeding individual sheets of flexible material, means for trimming and cutting the corners of said sheets, means for stripping said corners, means for scoring said sheets parallel to the edges thereof, means for applying adhesive adjacent the edges of said sheets, means for controlling the amount of adhesive applied to said edges, means for folding said edges over against the body of said sheets, means for partially drying said adhesive, means for pressing said folded over edges against the body of said sheets, means for applying decorative scores to said sheets, means for scoring and rounding the back portion of said sheets, means for collecting completed covers, means operatively associating said individual means.

References Cited in the file of this patent

UNITED STATES PATENTS

| 391,266 | Ogden | Oct. 16, 1888 |
| 490,895 | Bredenberg | Jan. 31, 1893 |
| 565,832 | Brauer | Aug. 11, 1896 |
| 834,011 | Leffler | Oct. 23, 1906 |
| 1,424,269 | Voigtman | Aug. 1, 1922 |
| 1,534,696 | Eldredge | Apr. 21, 1925 |
| 2,098,060 | Moyer | Nov. 2, 1937 |
| 2,556,787 | Bach | June 12, 1951 |

FOREIGN PATENTS

| 598,899 | Great Britain | Mar. 1, 1948 |